US011947902B1

(12) United States Patent
Grimshaw et al.

(10) Patent No.: US 11,947,902 B1
(45) Date of Patent: Apr. 2, 2024

(54) EFFICIENT MULTI-TURN GENERATIVE AI MODEL SUGGESTED MESSAGE GENERATION

(71) Applicant: Microsoft Technology Licensing, LLC, Redmond, WA (US)

(72) Inventors: Susan Marie Grimshaw, Kirkland, WA (US); Poonam Ganesh Hattangady, Seattle, WA (US); Caleb Whitmore, San Francisco, CA (US); Tashfeen Ahmed, Dublin (IE); Ravi Teja Koganti, Bellevue, WA (US); Michael Ivan Borysenko, Brighton (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/178,191

(22) Filed: Mar. 3, 2023

(51) Int. Cl.
| | |
|---|---|
| *G06F 3/048* | (2013.01) |
| *G06F 3/0482* | (2013.01) |
| *G06F 3/04847* | (2022.01) |
| *G06F 40/166* | (2020.01) |
| *G06F 40/205* | (2020.01) |
| *G06F 40/40* | (2020.01) |
| *G06N 3/0475* | (2023.01) |
| *G06N 3/09* | (2023.01) |

(52) U.S. Cl.
CPC .......... *G06F 40/166* (2020.01); *G06F 3/0482* (2013.01); *G06F 3/04847* (2013.01); *G06F 40/205* (2020.01); *G06F 40/40* (2020.01); *G06N 3/0475* (2023.01); *G06N 3/09* (2023.01)

(58) Field of Classification Search
CPC ...... G06F 40/166; G06F 40/40; G06F 40/205; G06N 3/09
See application file for complete search history.

(56) References Cited

U.S. PATENT DOCUMENTS

| | | | |
|---|---|---|---|
| 9,990,610 | B2 | 6/2018 | Agarwal et al. |
| 10,534,815 | B2 * | 1/2020 | Hazra ............... G06F 16/90324 |
| 10,594,757 | B1 | 3/2020 | Shevchenko et al. |
| 10,635,751 | B1 * | 4/2020 | Relangi ................... G06F 40/35 |

(Continued)

OTHER PUBLICATIONS

"Non Final Office Action Issued in U.S. Appl. No. 18/178,254", dated Jul. 18, 2023, 24 Pages.

(Continued)

*Primary Examiner* — David Phantana-angkool

(57) ABSTRACT

Systems and methods for using a generative artificial intelligence (AI) model using a multi-turn process to generate a suggested draft reply to a selected message. A first turn of the multi-turn process uses a shorter prompt including at least a portion of the body of the selected message and that requests multiple draft replies from the AI model. The resulting AI-generated draft replies are shortened, summarized, and/or otherwise converted into a plurality of shortened summaries that are presented as reply options to a user. Upon selecting a shortened summary, a more robust prompt is generated in a second turn with the AI model with the selected reply option to generate a more complex suggested draft reply to the selected message. Additionally, various customization options are provided, which when selected, reframe a query presented to the AI model to generate a more relevant and personalized response.

20 Claims, 14 Drawing Sheets

(56) References Cited

U.S. PATENT DOCUMENTS

| | | | |
|---|---|---|---|
| 10,691,473 B2* | 6/2020 | Karashchuk | G06F 3/0482 |
| 10,733,292 B2* | 8/2020 | Araujo | G06F 21/554 |
| 10,929,469 B2 | 2/2021 | Kirk et al. | |
| 11,100,179 B1 | 8/2021 | Zhou et al. | |
| 11,157,693 B2* | 10/2021 | Srinivasan | G06F 40/44 |
| 11,240,181 B1* | 2/2022 | Nagaraja | G16H 40/20 |
| 11,314,845 B2 | 4/2022 | Fenney | |
| 11,314,945 B1 | 4/2022 | Nguyen et al. | |
| 11,321,736 B2 | 5/2022 | Lagi et al. | |
| 11,418,461 B1 | 8/2022 | Elfardy et al. | |
| 11,516,158 B1* | 11/2022 | Luzhnica | H04L 51/02 |
| 11,580,099 B2* | 2/2023 | Chen | G06F 16/24575 |
| 11,646,014 B1 | 5/2023 | Harsola et al. | |
| 2007/0266095 A1 | 11/2007 | Billsus et al. | |
| 2015/0281156 A1 | 10/2015 | Beausoleil et al. | |
| 2017/0222961 A1 | 8/2017 | Beach et al. | |
| 2018/0189628 A1 | 7/2018 | Kaufmann et al. | |
| 2018/0210874 A1 | 7/2018 | Fuxman et al. | |
| 2018/0295081 A1 | 10/2018 | Mcgregor et al. | |
| 2018/0331979 A1* | 11/2018 | Rakovitsky | G06Q 30/0641 |
| 2018/0359199 A1 | 12/2018 | Nguyen et al. | |
| 2019/0138267 A1* | 5/2019 | Mailey | G06F 40/35 |
| 2019/0188562 A1* | 6/2019 | Edwards | G06N 5/045 |
| 2020/0019699 A1* | 1/2020 | Araujo | G06N 3/045 |
| 2020/0244605 A1 | 7/2020 | Nagaraja et al. | |
| 2020/0311640 A1 | 10/2020 | Grimshaw et al. | |
| 2020/0327189 A1* | 10/2020 | Li | G06F 40/56 |
| 2020/0410335 A1* | 12/2020 | Gu | G06V 10/776 |
| 2021/0056404 A1* | 2/2021 | Goswami | G06F 18/22 |
| 2021/0073377 A1* | 3/2021 | Coull | G06N 3/045 |
| 2021/0264109 A1* | 8/2021 | Srinivasan | G06F 40/166 |
| 2021/0264268 A1* | 8/2021 | Goswami | G06N 3/08 |
| 2021/0334472 A1 | 10/2021 | Shah et al. | |
| 2021/0350784 A1 | 11/2021 | Selvaggi | |
| 2021/0377391 A1 | 12/2021 | Thiyagarajan et al. | |
| 2021/0406836 A1 | 12/2021 | Bar-on | |
| 2022/0006761 A1* | 1/2022 | Magliozzi | G06Q 10/107 |
| 2022/0045975 A1 | 2/2022 | Flöther et al. | |
| 2022/0050967 A1* | 2/2022 | Veyseh | G06F 40/289 |
| 2022/0103504 A1* | 3/2022 | Byza | G06F 40/30 |
| 2022/0131821 A1 | 4/2022 | Habal et al. | |
| 2022/0138440 A1* | 5/2022 | Li | G06F 40/44 704/2 |
| 2022/0147714 A1 | 5/2022 | Reyderman | |
| 2022/0166738 A1* | 5/2022 | Gray | H04L 51/08 |
| 2022/0180242 A1* | 6/2022 | Lee | G06N 3/047 |
| 2022/0253472 A1* | 8/2022 | Oberoi | G06N 3/08 |
| 2022/0284889 A1* | 9/2022 | Travaglini | G10L 15/065 |
| 2023/0082014 A1* | 3/2023 | Bleeker | G16H 40/20 705/2 |
| 2023/0101224 A1* | 3/2023 | Singh | G06F 9/44526 707/770 |
| 2023/0108855 A1* | 4/2023 | Le | G06F 40/35 706/11 |
| 2023/0135962 A1* | 5/2023 | Lee | G06F 40/30 704/9 |
| 2023/0137209 A1* | 5/2023 | Nangi | G06F 40/216 704/9 |
| 2023/0162057 A1 | 5/2023 | Sharma et al. | |
| 2023/0185907 A1* | 6/2023 | Coull | G06N 3/08 726/23 |
| 2023/0205826 A1 | 6/2023 | Leshinsky | |
| 2023/0216836 A1* | 7/2023 | Lee | G06V 30/414 726/14 |
| 2023/0229852 A1* | 7/2023 | Muralidharan | G06F 40/166 715/254 |
| 2023/0237263 A1* | 7/2023 | Howell | G06F 18/2155 704/9 |
| 2023/0237584 A1* | 7/2023 | Sanchez | G07C 5/008 705/4 |
| 2023/0245651 A1* | 8/2023 | Wang | G10L 13/027 704/275 |

OTHER PUBLICATIONS

"Non Final Office Action Issued in U.S. Appl. No. 18/117,222", dated Oct. 4, 2023, 60 Pages.

* cited by examiner

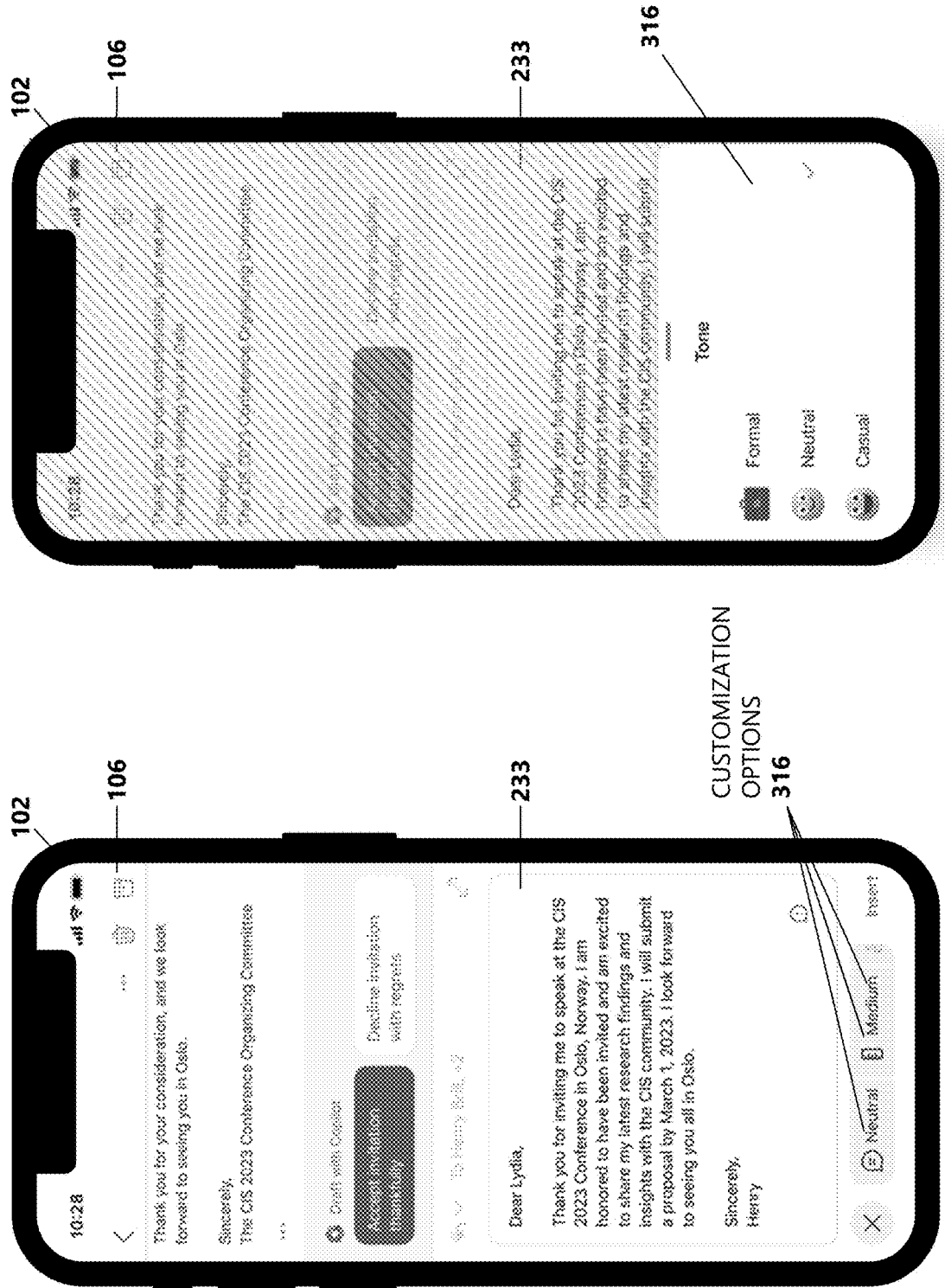

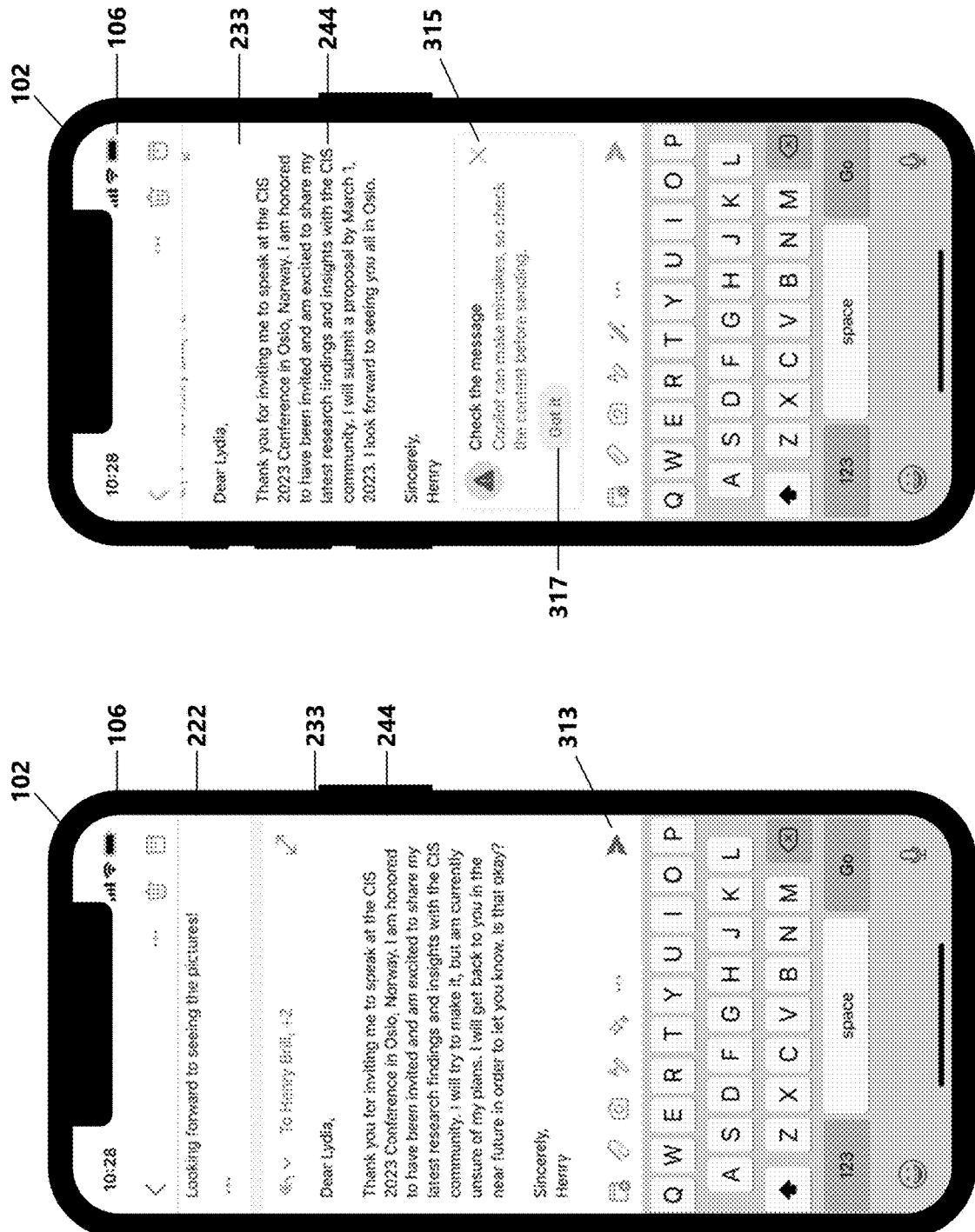

EFFICIENT MULTI-TURN GENERATIVE AI MODEL SUGGESTED MESSAGE GENERATION

BACKGROUND

Productivity applications are designed to help entities (e.g., individuals and organizations) generate content and data (e.g., electronic communications, schedules, documents, projects) more efficiently. Some productivity applications are used to receive, compose, and respond to electronic communications, such as emails, text messages, chat messages, etc., (generally, messages). Generating new content for a message can consume large amounts of time. For instance, replying to a message can entail reading a previous one or more messages in a conversation to understand a context of the conversation, determining what a sender is communicating and/or requesting, and further determining an appropriate response to the message.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for generating a suggested reply message using a generative artificial intelligence (AI) model.

In an example implementation, a message generation system and method are described that use a multi-turn process with the AI model to generate a suggested draft reply to a selected message. A first turn of the multi-turn process uses a shorter prompt including at least a portion of the body of the selected message and requests multiple draft replies from the AI model. The resulting AI-generated draft replies are shortened, summarized, and/or otherwise converted into a plurality of shortened summaries that are presented as reply options to a user. Upon selecting a shortened summary, a more robust prompt is generated for a second turn with the AI model to generate a more complex suggested draft reply to the selected message. Accordingly, the system and method provide more accurate results without having to send large prompts at the outset when generating the initial options for selection. Additionally, various customization options are provided, which when selected, reframe a prompt presented to the AI model to generate a more relevant and personalized response.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 3D is an illustration showing an example suggested draft reply and various customization options according to an example;

FIG. 3E is an illustration showing additional customization options according to an example;

FIG. 3J is an illustration showing an example send option presented with the reply message according to an example;

FIG. 3K is an illustration showing an example guardrail activated in response to a selection of the send option;

DETAILED DESCRIPTION

Examples described in this disclosure relate to systems and methods for generating a suggested message through the use of a generative artificial intelligence (AI) model, such as a large language model (LLM). In an example implementation, an electronic-communications productivity application is used to help a user to generate an electronic communication, such as an email, text message, chat message, or the like. Such electronic communications are hereinafter referred to generally as messages and the electronic communications productivity application is hereinafter referred to generally as a messaging application. According to an example, a message generator is provided that generates complex messages from LLMs, such as a suggested draft reply to a selected message.

Figure 1:
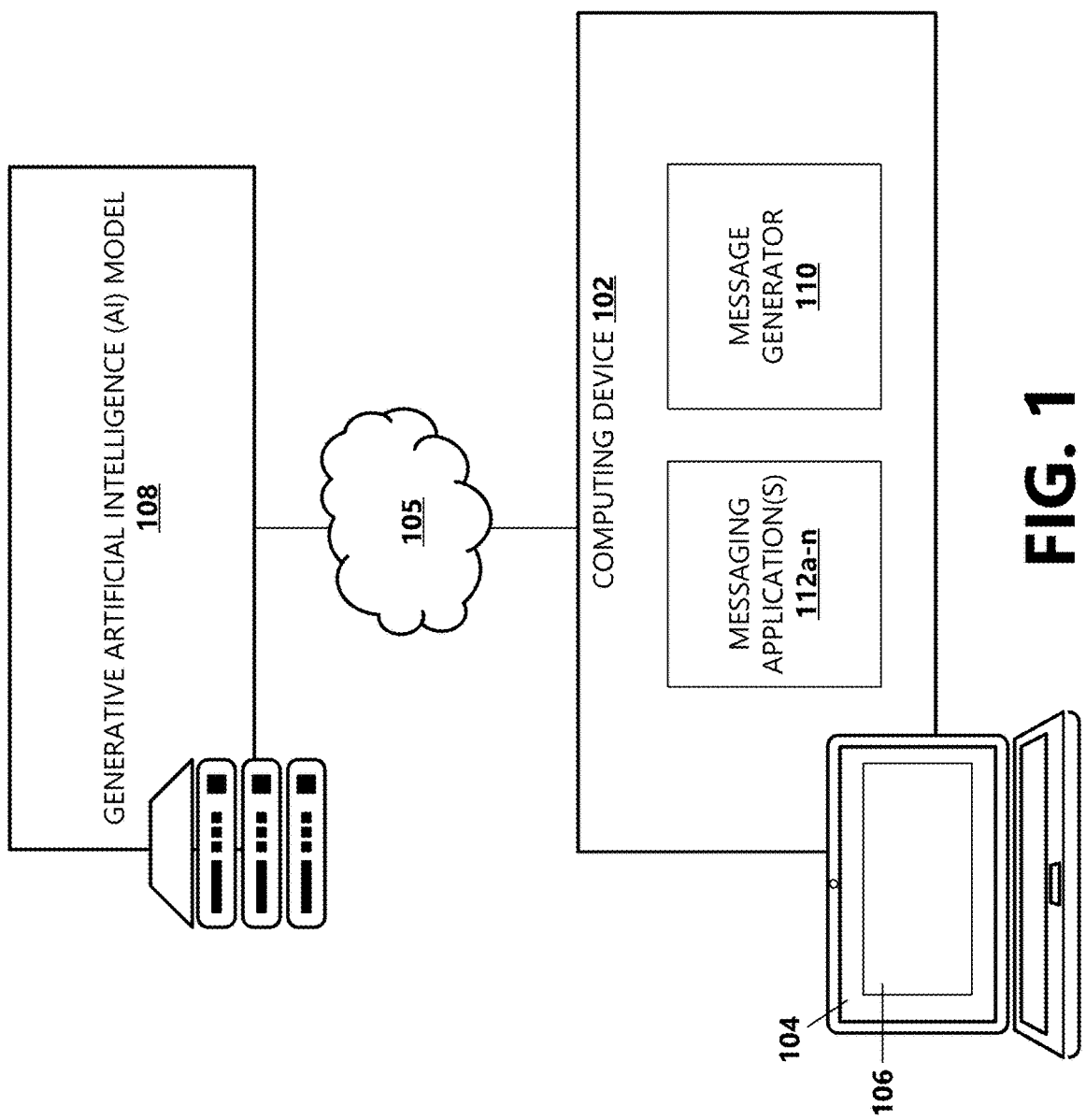
FIG. 1 is a block diagram of a system in which a suggested message generation system is implemented according to an example.
Figure 8:
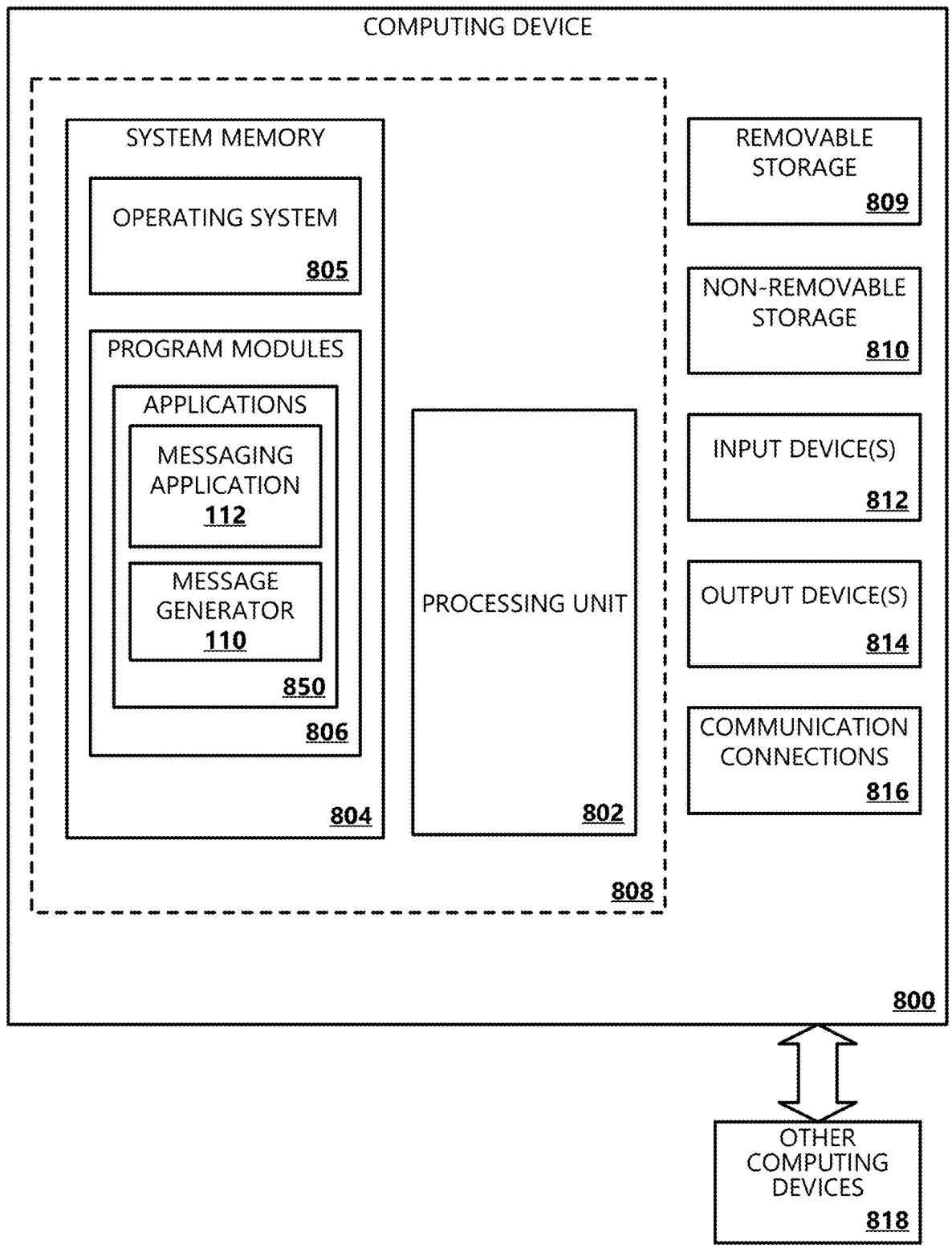
FIG. 8 is a block diagram illustrating example physical components of a computing device with which aspects of the disclosure may be practiced.

FIG. 1 is a block diagram of an example system 100 for providing suggested message generation in accordance with an example embodiment. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 8. In another example, the components of systems disclosed herein are distributed across multiple processing devices. For instance, input may be entered on a user device or client device and information may be processed on or accessed from other devices in a network, such as one or more remote cloud devices or web server devices.

The example system 100 generates a suggested message using a generative AI model 108, which may be an LLM. According to an aspect, the system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

In examples, the computing device 102 includes a plurality of productivity applications (collectively, productivity applications) for performing different tasks, such as communicating, information generation and/or management, data manipulation, visual construction, resource coordination, calculations, etc. According to an example implementation, the productivity applications include at least one messaging application 112 that operates to allow users to send and receive messages. Messages can be in various formats, such as text, audio, images, and/or video. Example messaging applications 112 include, but are not limited to, an email application, a messaging application, a chat application, a voicemail application, enterprise software, an information worker application, and the like. The messaging application(s) 112 may be local applications or web-based applications accessed via a web browser. Each messaging application 112 has one or more application UIs 106 by which a user can view and generate messages and interact with features provided by the messaging application 112. For example, an application UI 106 may be presented on the display screen 104. In some examples, the operating environment is a multi-application environment by which a user may view and interact with multiple messaging applications 112 through multiple application UIs 106.

According to examples, the system 100 further includes a message generator 110 that helps users draft a message. In some examples, the message is a new message (e.g., a first communication in a conversation thread). In other examples, the message is a reply message (e.g., a subsequent communication to the first communication in a conversation thread). In some implementations, the message generator 110 is included in one or more messaging applications 112. According to an example, the message generator 110 is a separate module that is communicatively integrated into one or more messaging applications 112 via an application programming interface (API). As will be described in further detail below, the message generator 110 provides functionality for generating content for a suggested message. In an example implementation, the message generator 110 combines at least a portion of a selected message and a request phrase to form a prompt for requesting one or more draft messages. In another example implementation, the message generator 110 obtains additional context information and includes the additional context information in a prompt for requesting one or more draft messages to improve the suggested compose content for the user. In a further example implementation, the message generator 110 optimizes the prompt that is provided to the generative AI model 108 so that responses include more relevant information and reduce latency. In yet a further example implementation, the message generator 110 evaluates a selected message to determine whether to trigger draft message-generation using the generative AI model 108, thus limiting draft generation to only a subset of messages. In another example implementation, the message generator 110 determines whether to present a confirmation prior to sending a suggested draft message. These and other examples are described below in further detail with reference to FIGS. 2-8.

According to example implementations, the generative AI model 108 is a generative machine learning model trained to understand and generate sequences of tokens, which may be in the form of natural language (e.g., human-like text). In various examples, the generative AI model 108 can understand complex intent, cause and effect, perform language translation, semantic search classification, complex classification, text sentiment, summarization, summarization for an audience, and/or other natural language capabilities.

In some examples, the generative AI model 108 is in the form of a deep neural network that utilizes a transformer architecture to process the text it receives as an input or query. The neural network may include an input layer, multiple hidden layers, and an output layer. The hidden layers typically include attention mechanisms that allow the generative AI model 108 to focus on specific parts of the input text, and to generate context-aware outputs. Generative AI model 108 is generally trained using supervised learning based on large amounts of annotated text data and learns to predict the next word or the label of a given text sequence.

The size of a generative AI model 108 may be measured by the number of parameters it has. For instance, as one example of an LLM, the GPT-3 model from OpenAI has billions of parameters. These parameters are the weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The generative AI model 108 in examples herein, however, is pre-trained, meaning that the generative AI model 108 has already been trained on the large amount of data. This pre-training allows the model to have a strong understanding of the structure and meaning of text, which makes it more effective for the specific tasks discussed herein.

In example implementations, the generative AI model 108 operates on a device located remotely from the computing device 102. For instance, the computing device 102 may communicate with the generative AI model 108 using one or a combination of networks 105 (e.g., a private area network (PAN), a local area network (LAN), a wide area network (WAN)). In some examples, the generative AI model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

Figure 2:
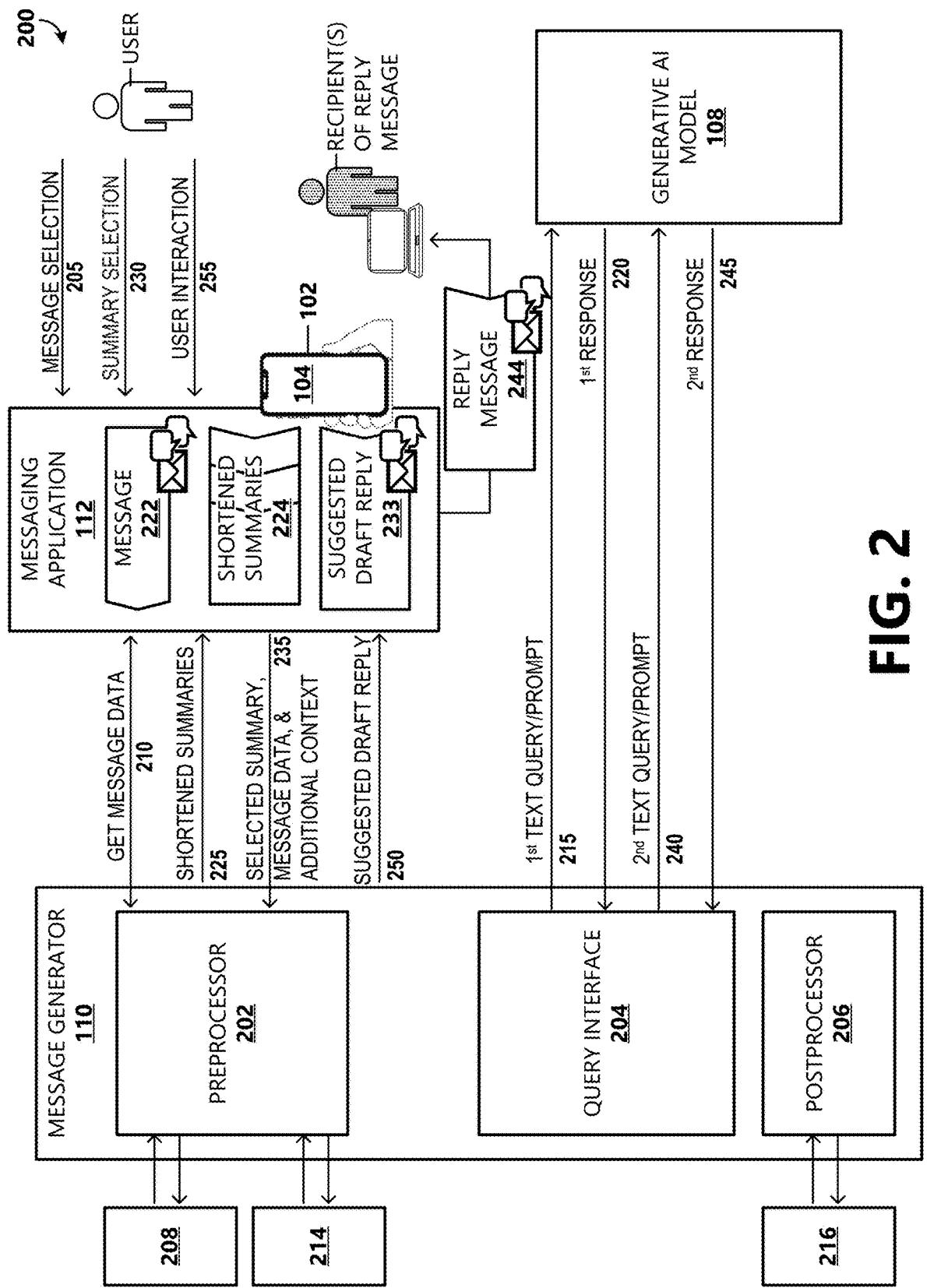
FIG. 2 is a block diagram of example components of a suggested message generation system and an example data flow.

FIG. 2 is a block diagram illustrating example components of the message generator 110 and an example data flow 200 according to an embodiment. As depicted, the message generator 110 includes a preprocessor 202, a query interface 204, and a postprocessor 206. A user may use the messaging application 112 to receive messages 222 and to generate content for messages 222. The user may interact with a received message 222. For instance, the user may view the message 222 for a length of time and/or scroll through at least a portion of the body of the message 222. Data communication 205 represents user input corresponding to the message 222, sometimes hereinafter referred to as a message selection. In some examples, the message selection corresponds to a selection to view at least a portion of the message 222 in an application UI 106 provided by a messaging application 112 and displayed on a display 104 of a computing device 102. According to another example, the message selection corresponds to a selection to respond to the message 222. According to a further example, the message selection corresponds to a selection to receive suggested responses to the message 222.

In some examples, the message 222 is an email. In other examples, the message 222 is a text message. In still other examples, the message 222 is a chat message or other type of electronic communication. According to examples, the message 222 includes various parts, such as one or more recipient identifiers, a subject, a body, a signature, one or more attachments and/or other parts. For instance, a recipient identifier is a unique identifier (e.g., a username and a domain name separated by the "@" symbol, a phone number) for the recipient(s) of the message 222. According to an example, the subject includes a text string describing content of the message 222. According to another example, the body includes primary content of the message 222 including text strings that convey a purpose of the message 222. The text strings may be included in a single paragraph or may be separated into multiple paragraphs. In some examples, the body includes an introduction, such as a greeting and/or an introduction to the recipient(s). In further examples, the body includes a main message including information relevant to the message, such as information to communicate to the recipient(s). In some examples, the body includes text strings generated from recorded audio content, such as a voicemail message, a recorded meeting, or another type of audio message. In some examples, the body further includes a closing, such as a final thought or closing statement. In additional examples, the body includes a signature, which may include the sender's name, contact information, job title, company name, and/or other sender details.

In further examples, the message 222 may have a classification, such as a focused message, a confidential message, or other types of message. For instance, the message 222 is determined as important to the user or having some other relationship to the user. As an example, focused messages may include messages from work, contacts, people the user interacts with frequently, and other messages detected as important, as opposed to newsletters, advertisements, automatically generated messages, bulk emails, and other types of messages that may be detected as less important. In another example, the message 222 includes non-confidential information or is not marked as including confidential information. If the message does include confidential information or has been marked by the user as confidential, the message may be categorized as as confidential.

In a further example, the message 222 additionally or alternatively conveys information through other types of content, such as multimedia content. For instance, audio, image, and/or video content may be included directly in the body of the message 222, where the recipient of the message 222 (e.g., the user) can view the multimedia content without having to download or open any attachments. In another example, the message 222 includes one or more attachments, where the other content is included as a separate file that is attached to the message 222. In some instances, the recipient may download the attachment and open it with an appropriate application to view the other content. Other types of messages 222 are possible and are within the scope of the present disclosure.

In some examples, the message selection causes the message generator 110 to perform a multi-turn process with the generative AI model 108 to generate a suggested draft reply 233 to the selected message 222. For instance, data communication 210 corresponds to communications between the messaging application 112 and the preprocessor 202 of the message generator 110 in a first turn of the multi-turn process. In the first turn, the preprocessor 202 receives an indication of the message selection and extracts data from the selected message 222. According to an example implementation, the extracted data includes at least a portion of the body of the message 222.

In some examples, the preprocessor 202 extracts string content from the selected message 222. For instance, the messaging application 212 includes an object model that allows objects (e.g., text boxes, images, diagrams) in the message 222 to be evaluated for string content. In some examples, the preprocessor 202 gathers extracted string content from the body of the selected message 222 into a first context object, where a context object is a data structure that includes information that can be used to understand context about the content of the message 222. According to examples, the term "context" is used to describe information that can influence an interpretation and execution of the request to generate content as part of a reply message to the sender and/or other recipients of the message 222. For instance, if the body includes string content about a specific topic, the generative AI model 108 can use that information to generate one or more replies to the message 222 that are relevant to that topic. In some examples, the preprocessor 202 selects a portion of the extracted string content to include in the first context object.

According to examples, the preprocessor 202 further generates a first prompt by combining the first context object and a predefined request. For instance, the predefined request includes a phrase or action to generate a reply to a message. In some examples, the predefined request includes a defined number of replies to be generated for the message. An example predefined request includes: "Generate N different replies to this message:", where "N" is a predefined number (e.g., 2-5). In an example implementation, the preprocessor 202 further includes the first prompt in a first text query as input for the generative AI model 108. In some examples, the predefined request is prepended to the first context object. For instance, the resultant first text query may be in the form of "Generate N different replies to this message:" +first_context_Object. In further examples, the predefined request includes a length-limiting portion to limit the requested replies to a word maximum (e.g., 5-7 words). In still further examples, the maximum number of words is conditional on a screen size of the display 104 of the user's computing device 102. The first text query or prompt is represented as data communication 215 in FIG. 2, where the first text query is a communication between the query interface 204 and the generative AI model 108. For instance, the generative AI model 108 analyzes the first text prompt to generate N relevant responses. In examples, the generative AI model 108 uses information included in the first context object to understand the context of the first text prompt.

In some examples, and as described in further detail below, various guardrails are put into place to limit the number of times the generative AI model 108 is invoked to generate suggested replies. For instance, in some examples, the message generator 110 is limited or controlled to generate the first prompt and send the first prompt to the generative AI model 108 based on various criteria being satisfied. This may prevent all selected messages from causing the draft generation process to occur. For instance, a suggested draft reply 233 to a selected message 222 may only be generated for messages of certain types, such as focused messages, non-confidential messages, etc. In some examples, the first text prompt is only triggered after a focus/interaction threshold for the selected message 222 is met, such as the user interacting with the message (scrolling) or the message being opened for a minimum threshold duration. Other guardrails are possible and are within the scope of the present disclosure.

Data communication 220 represents the generative AI model's response to the first text prompt. In some examples, the response includes text output, such as JSON text, where the text output includes multiple AI-generated replies separated by a separation point (e.g., a line break; a number in a numbered list; a bullet in a bulleted list; a particular punctuation mark(s)). According to an example implementation, the postprocessor 206 receives the first response and parses the text output to generate a shortened summary 224 of each reply. For instance, each shortened summary 224 is representative of the AI-generated replies to the selected message 222. In some examples, the shortened summaries 224 are limited in size to the maximum number of words included in the length-limiting portion of the first text prompt. The postprocessor 206 performs one or more rounds of postprocessing to generate the shortened summaries 224. In an example implementation, the postprocessor 206 separates the text output into the AI-generated multiple replies based on the separation point(s). In some examples the postprocessor 206 shortens/summarizes the text output by identifying a first delimiter, such as a colon, which may indicate a plurality of answers included in the text output. According to an example, the postprocessor 206 discards the text output before the first delimiter and separates the remaining text output into the N replies. According to another example, the postprocessor 206 further summarizes each of the N replies by trimming leading spaces and trailing spaces of each reply, and further by identifying and removing content separated by particular punctuation marks (e.g., parentheses, square brackets, round brackets). In some examples, in generating the shortened summaries 224, the postprocessor 206 further shortens replies that are over the word maximum.

Figure 3A:
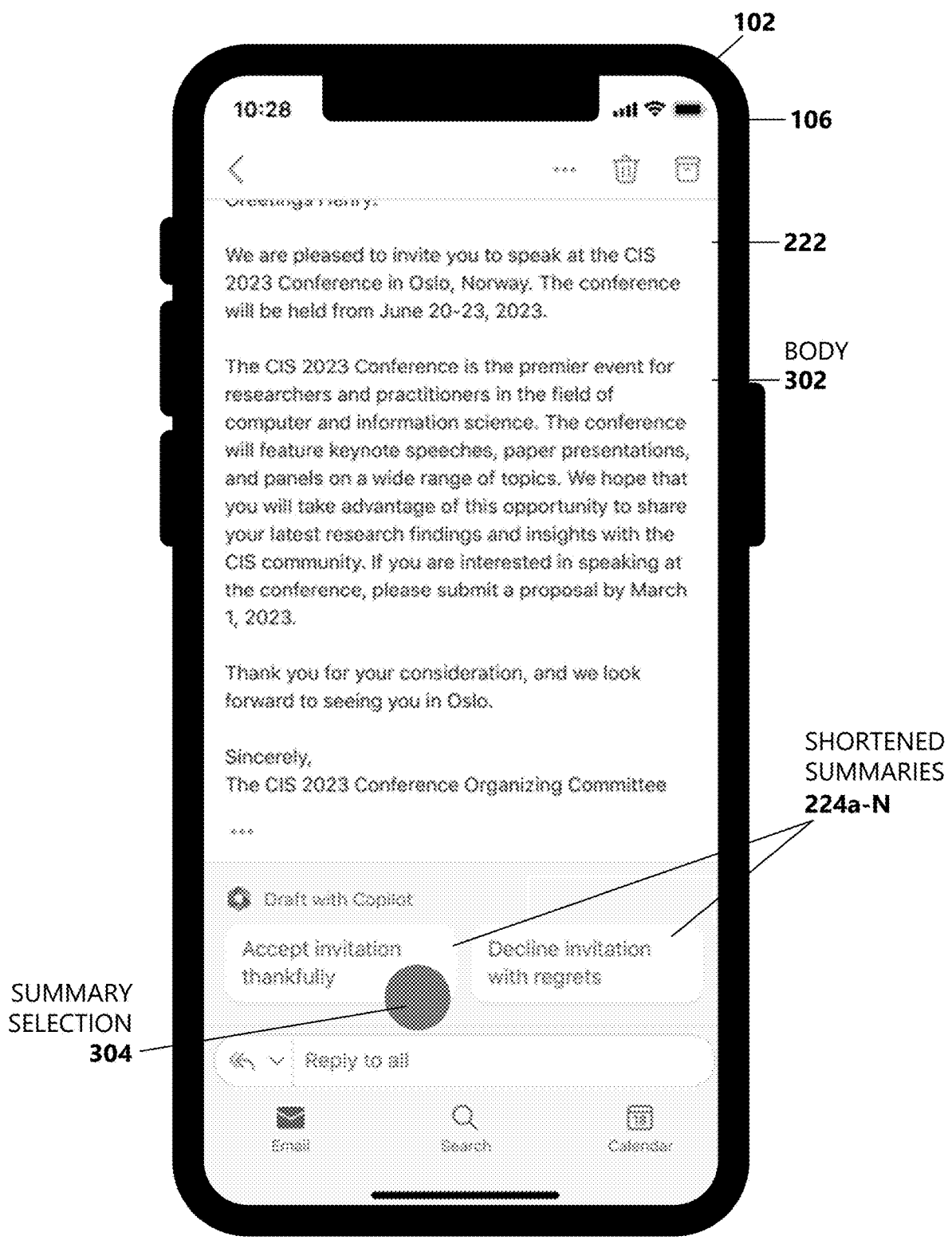
FIG. 3A is an illustration showing example shortened summaries presented as suggested replies to a selected message.

Data communication 225 represents a communication between the message generator 110 and the messaging application 112, where the message generator 110 transmits the shortened summaries 224 to the messaging application 112. In some examples, the shortened summaries 224 are surfaced in the application UI 106 for display to the user. Some example shortened summaries 224a-N (collectively, shortened summaries 224) generated and presented as suggested replies to a concurrently displayed message 222 are depicted in FIG. 3A. In some examples, an option is provided in the application UI 106 that allows the user to select a shortened summary 224 of the surfaced shortened summaries for generating a draft reply message 233 to the message 222. For instance, the shortened summaries 224 may be selectable. Data communication 230 represents a user selection of a shortened summary 224. According to an example implementation, an option is presented in the application UI 106 that allows the user to select to provide a shortened summary input. For instance, the user inputs a description of what they would like to include in a reply message 244.

Data communication 235 corresponds to communications between the messaging application 112 and the preprocessor 202 of the message generator 110 in a second turn of the multi-turn process. In the second turn, the preprocessor 202 receives the user-selected shortened summary 224 (which may include a user-input summary) from the messaging application 212. Additionally, data communication 235 includes message data including at least a portion of the body of the message 222. For instance, in the second turn, text content included in the user-selected shortened summary 224 and in the body is extracted and transmitted to the preprocessor 202. Additionally, the preprocessor 202 gathers extracted string content from the user-selected shortened summary 224 and the body of the selected message 222 into a second context object used to understand context about the content of the message 222. For instance, the second context object is included in a second prompt provided to the generative AI model 108 that includes a request to generate a reply to a message.

In some examples, the body includes one or more previous messages in a communication/message string in which the selected message 222 is included, where, in further examples, the header and the body of the one or more previous messages are included. In further examples, the message data further includes at least a portion of the header of the message 222. For instance, text content included in the header, such as a sender, one or more recipients (e.g., the user, other recipients) of the message 222, and a subject, if included, are extracted, transmitted to the preprocessor 202, and included in the second context object.

According to some examples, and as described in further detail below, in the second turn of the multi-turn process, the preprocessor 202 uses inferred context in the second prompt to improve the generated reply by incorporating personalized details. For instance, in some examples, data communication 235 further includes additional context, where the additional context is included in the second context object as inferred context to improve a suggested reply to the message 222 for the user. In some examples, the additional context includes additional data regarding the sender of the message 222. In further examples, the additional context includes additional data regarding the recipient(s) of the message 222.

According to some examples, and as described in further detail below, in the second turn of the multi-turn process, the preprocessor 202 is in communication with one or more data sources 208 that provide additional data regarding the sender and/or the recipient(s) of the message 222. In an example implementation, the data source(s) 208 include a social medial profile of the sender/recipient(s). For instance, the user's profile information can be used to personalize the reply (e.g., user signature, domain experience). The domain experience may mean the actual experience of the user with a particular business product, technology, and/or other specialty. Additionally, the sender's profile can include a preferred name, preferred pronoun information, information about significant events associated with the sender. In another example implementation, the data source(s) 208 include an organizational chart of an enterprise corresponding to the sender/recipient(s). For instance, information extracted from the organizational chart may define a relationship between the user and the sender of the message 222. When the message 222 includes a plurality of recipients, information extracted from the organizational chart may define relationships between the user and/or sender and the other recipient(s). As an example, the reply may be further personalized based on an inferred relationship between the user and the sender of the message 222.

In an example implementation, the additional context includes additional data regarding historical sent messages from the user. For example, the historical sent messages include one or more messages sent from the user to the sender of the message 222. In another example, the historical sent messages include one or more messages sent from the user to one or more other recipients of the message 222. For instance, the user's preferred communication style can be inferred from past communications with similar conversation participants and used to further tailor the suggested draft reply 233 to the message 222. In further examples, the preprocessor 202 extracts multimedia content (e.g., images, videos, audio) from the message 222. According to an example implementation, the preprocessor 202 includes or is in communication with one or more resources 214 that convert the multimedia content into text strings that are further included in the second context object. In one example, a resource 214 includes an image processor that performs image recognition on extracted images to identify and categorize objects, people, scenes, actions, and other context within the images. For instance, the image processor uses machine learning algorithms and deep learning neural networks to analyze and classify visual data, recognize patterns and objects in the images, and understand and interpret content of the images. In some examples, the image processor returns text string content representative of recognized visual data in the images. According to another example implementation, the preprocessor 202 includes or is in communication with a resource 214 operative to perform audio transcription on audio content and generate text string content representative of recognized audio data included in the message 222. In some examples, the preprocessor 202 includes the string content representative of the multimedia content in the second context object.

According to some examples, and as described in further detail below, in the second turn of the multi-turn process, the preprocessor 202 optimizes the second context object included in a second prompt that is provided to the generative AI model 108 so that responses include more relevant information and reduce latency. For instance, the preprocessor 202 selectively includes and/or formats information in the extracted message data and/or additional context in the second prompt to improve the integrity of the result. In further examples, the preprocessor 202 selectively omits information from the extracted message data and/or additional context without compromising the integrity of the generative AI model 108 results.

According to examples, the preprocessor 202 further generates a request phrase for the second prompt and combines the generated request phrase with the second context object. In some examples, the generated request phrase includes a phrase or action to generate a reply. In further examples, the generated request phrase includes a reference to or a description about the sender of the message 222 and/or recipient(s) of the message 222. In additional examples, the generated request phrase includes a length limitation for the suggested draft reply 233 (e.g., no more than 5 sentences, at least 3 paragraphs). In still further examples, the generated request phrase includes additional instructions, where the additional instructions include context inferred by the extracted message data and/or additional context. For instance, inferred content can include how verbose, polite, respectful, the user typically is when replying to communications. An example generated request includes: "I am emailing a close friend. Write a verbose email in more than 10 sentences covering the following outline. Be cheeky and charming." In an example implementation, the preprocessor 202 further combines the second context object with the second prompt to generate a second text prompt as input for the generative AI model 108. In some examples, the second prompt is prepended to the second context object. For instance, the resultant second text prompt may be in the form of ""I am emailing a close friend. Write a verbose email in more than 10 sentences covering the following outline. Be cheeky and charming." +second_context_Object."

The second text prompt is represented as data communication 240 in FIG. 2 as a communication between the query interface 204 and the generative AI model 108. For instance, the generative AI model 108 analyzes the second text prompt to generate a relevant response. In examples, the generative AI model 108 uses information included in the second context object to understand the context of the second text prompt y. Data communication 245 represents the generative AI model's response to the second text prompt. In some examples, the second response includes text output, such as JSON text, where the text output includes an AI-generated reply to the second prompt. According to an example implementation, the postprocessor 206 receives the second response and parses the text output to generate a suggested draft reply 233. For instance, in the second turn of the multi-turn process with the generative AI model 108, the message generator 110 generates a suggested draft reply 233 to the selected message 222 based on a user-selection of a shortened summary 224 generated in the first turn of the process.

In some examples, the postprocessor 206 uses the text output from the generative AI model 108 to include in one or more graphical elements (e.g., images, animations, emojis, graphs) in the suggested draft reply 233. For instance, if the selected message 222 includes certain types of graphical elements, the postprocessor 206 generates and includes like graphical elements in the suggested draft reply 233 to represent the text output. As another example, if the additional context reveals historical user behavior of including particular graphical elements in messages in general, in messages to the sender of the selected message 222, and/or in messages to other recipients of the selected message, the postprocessor 206 generates and includes like graphical elements in the suggested draft reply 233. In some implementations, the postprocessor 206 is in communication with one or more other resources 216 to obtain or generate graphical elements for the suggested draft reply 233. As an example, the postprocessor 206 is in communication with a search engine to obtain a photograph, clip art, emoji, or other type of image relevant to the text output. As another example, the postprocessor 206 is in communication with a library of graphic elements relevant to the text output. As another example, the postprocessor 206 parses at least a portion of the text output into a table, where a graphing tool resource 216 in communication with the postprocessor 206 generates a graph from the data in the table.

As another example, the postprocessor 206 is in communication with a resource 216, such as an ML image generation model, where the postprocessor 206 generates a text query and queries the resource 216 based on the text output. For instance, the AI art generation model generates and provides an image relevant to text output of the generative AI model 108. For example, the ML image generation model may be another language model based on a transformer architecture that is trained to generate images based on textual descriptions, such as the DALL-E model from OpenAI. Alternatively, the generative AI model 108 may be configured and/or trained to generate images in addition to text. In such examples, the response from the generative AI model 108 may also include images. In other examples, the generated text query may also be provided to the ML image generation model, rather than (or in addition to) the response generated from the generative AI model 108. Whether images are generated as a response to a selection of a shortened summary 224 for a reply to a selected message 222 may correspond to selection of an option provided in the application UI 106. Other types of resources 216 are possible and are within the scope of the present disclosure.

Data communication 250 represents a communication between the message generator 110 and the messaging application 112, where the message generator 110 transmits the suggested draft reply 233 to the messaging application 212. In some examples, the suggested draft reply 233 is surfaced in the application UI 106 for display to the user. An example suggested draft reply 233 generated and presented in the application UI 106 is depicted in FIG. 3D. According to examples, the suggested draft reply 233 includes a header that includes one or more recipients, where the one or more recipients include the sender of the selected message 222. In some examples, the suggested draft reply 233 is a reply-all message, where the one or more recipients include the sender and the other recipients of the selected message 222.

The user may interact with the suggested draft reply 233. Data communication 255 represents this user interaction. For instance, the user may view the suggested draft reply 233 for a length of time and/or scroll through at least a portion of the body of the suggested draft reply 233. In some examples, one or more customization options are provided in the application UI 106, which when selected, cause the message generator 110 to regenerate a suggested draft reply 233 based on the selected customization options. Example customization options include tone editing options, length editing options, a prompt input, etc. For instance, the message generator 110 generates a subsequent prompt for the generative AI model 108 for a subsequent query, where the results from the subsequent query are included in a next suggested draft reply 233 that is presented to the user. Non-limiting example tone editing options include options to make the tone of the suggested draft reply 233 more neutral, formal/serious/polite/professional, friendly/casual/informal, persuasive, informative, firm/direct, celebratory/congratulatory, cheeky, excited, somber, peaceful, etc. Non-limiting example length editing options include options to make the suggested draft reply 233 shorter, longer, or medium in length. In some examples, the user may provide a prompt input via a selected option. In some examples, a prompt UI field is provided in the application UI 106 via which the user can provide the prompt input. For instance, the user may type, speak, or otherwise input a phrase or individual keywords in association with a statement, question, instructions, or other request for editing the suggested draft reply 233. As an example, the user may type or utter a phrase such as, "Make this sound like a child wrote it", "Add a story", or "Make this funnier", which is received as the prompt input and included in the subsequent prompt and query.

In some examples, an option is provided that allows the user to continue to draft the reply message 244 using the suggested draft reply 233. For instance, selection of the option may cause the suggested draft reply 233 to be inserted into the reply message 244. According to examples, the reply message 244 is editable and the user may interact with the reply message 244 by editing it. In examples, an option is provided that allows the user to send the reply message 244. In some examples, and as described in further detail below, various guardrails (e.g., "speedbumps") are put into place to prevent the user from accidentally sending the suggested draft reply 233. In some implementations, if the user has not made any changes (or a sufficient number of changes) before selecting the send option, a notification is displayed requesting a confirmation from the user to send the message. Other heuristics may additionally or alternatively be provided, such as a time duration between displaying the suggested draft reply 233 and receiving the selection of the send option. In some implementations, the send option is presented after the sufficient number of changes or a minimum time duration. Other types of guardrails are possible and are within the scope of the present disclosure. In some examples, when the send option is selected and the guardrail criteria are satisfied, the message generator 110 allows the reply message 244 to be sent to one or more recipients.

With reference now to FIG. 3A, an illustration of an example application UI 106 is depicted including example shortened summaries 224a-N (collectively, shortened summaries 224) presented as suggested replies to a selected message 222. As shown in the depicted example, the selected message 222 includes a body 302 through which the user has scrolled through at least a portion. In some examples, various guardrails are employed to limit or control the messages 222 for which shortened summaries 224 are generated. In some examples, the message generator 110 generates and presents multiple shortened summaries 224 to the user after a focus/interaction threshold for the selected message 222 is met, such as the user interacting with the message (scrolling) or the message 222 being opened for at least a minimum threshold duration. For instance, there may be several interaction indicators that indicate actual interaction with the message 222, such as a scroll interaction or viewing the message for a sufficient duration. As depicted, a summary selection 304 can be made by the user (e.g., a selection of a shortened summary 224 or user-input shortened summary). The summary selection 304, for example, triggers the second turn of the multi-turn process with the generative AI model 108 to generate a suggested draft reply 233 to the message 222.

Figure 3B:
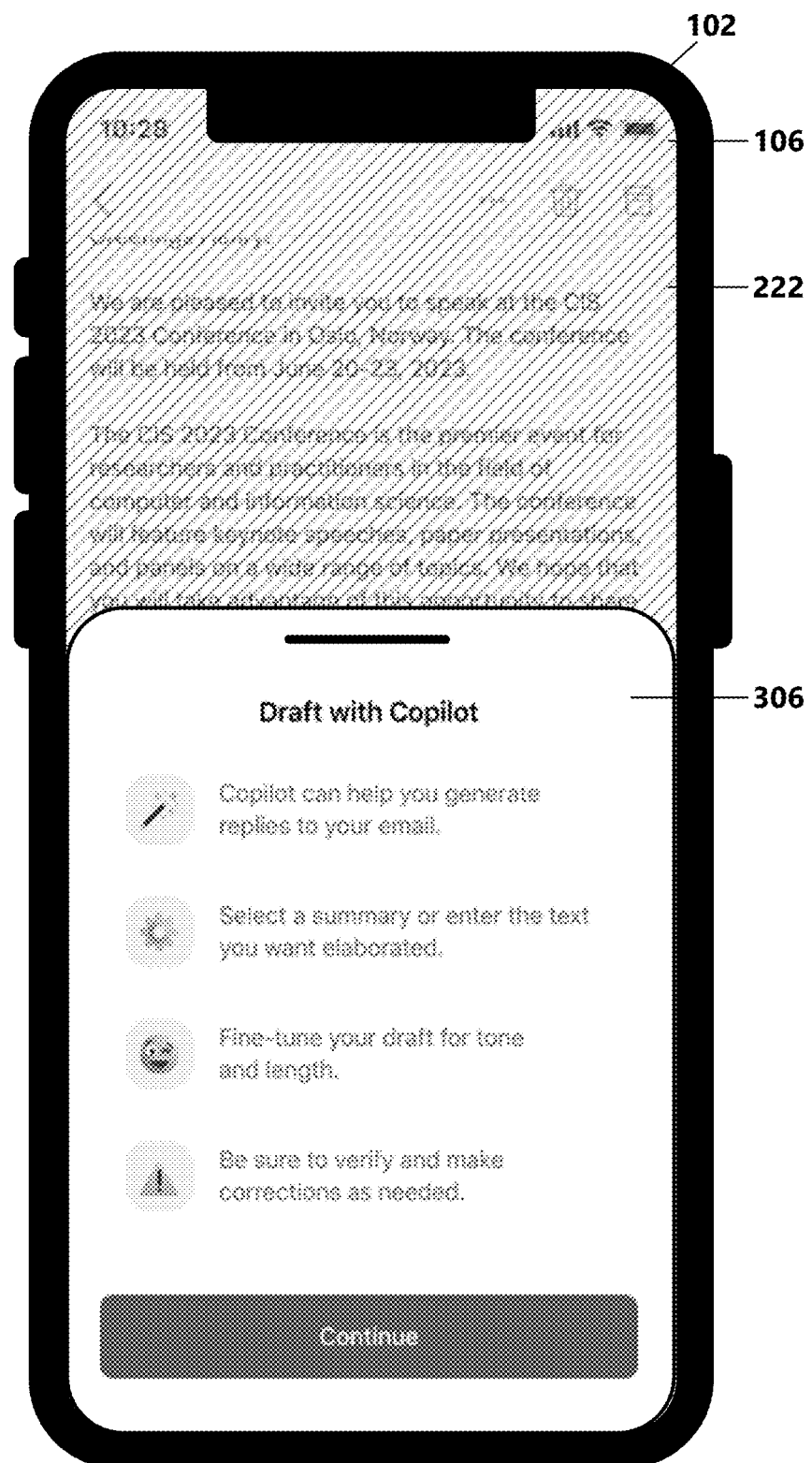
FIG. 3B is an illustration showing an example onboarding notification.

With reference now to FIG. 3B, an illustration of an example onboarding notification 306 is depicted that informs the user about features of the message generator 110. For instance, the onboarding notification 306 may help set expectations for the user as to current abilities and/or current limitations of the message generator 110 and/or generative AI model 108. According to examples, in response to receiving the summary selection 304, the message generator 110 enters a loading state, where the message generator 110 is performing preprocessing operations, querying the generative AI model 108, and postprocessing the model's response to generate an elaborated reply to the message 222.

Figure 3C:
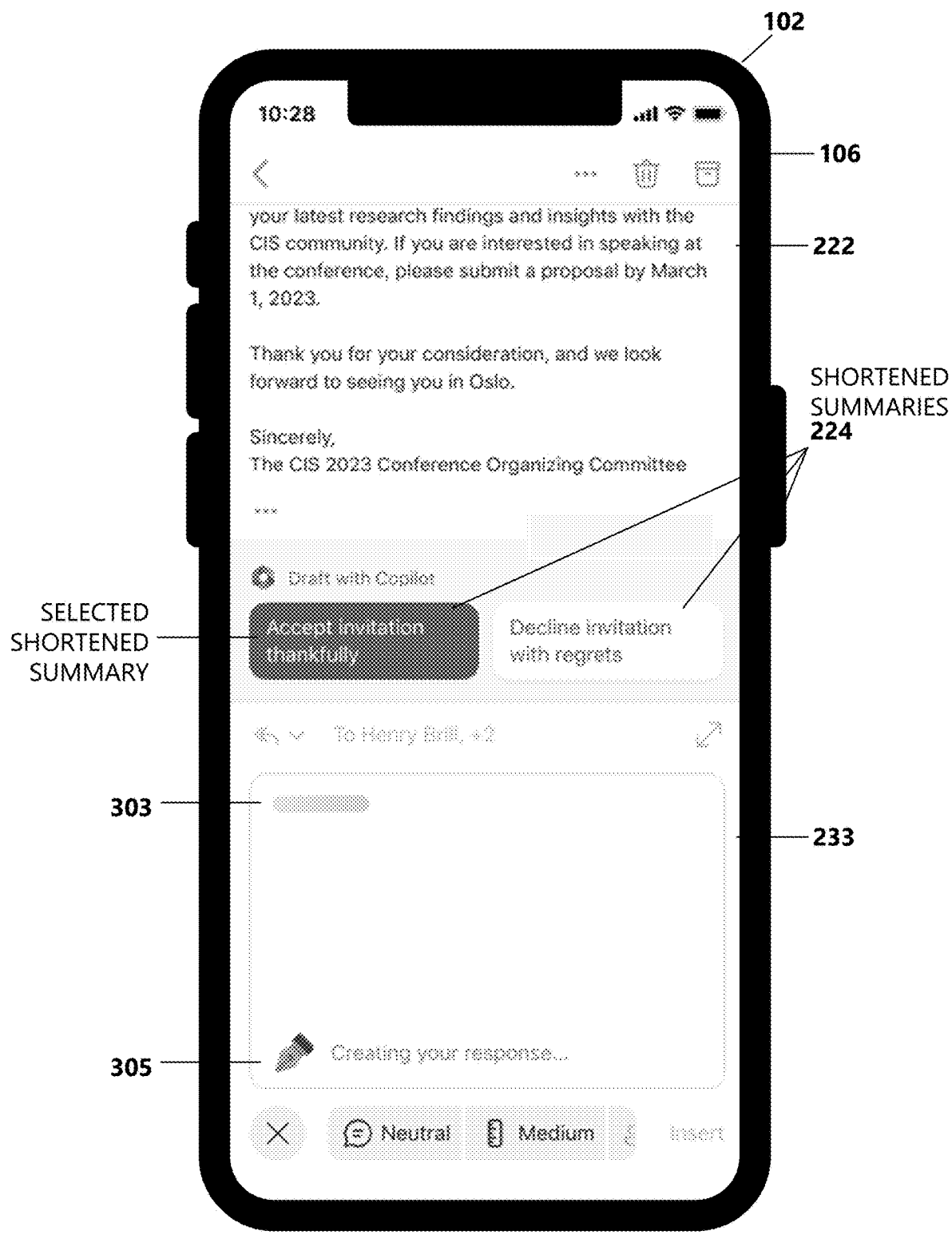
FIG. 3C is an illustration showing an indication that a suggested draft reply is being generated in response to a selection of a shortened summary according to an example.

With reference now to FIG. 3C, an indication 303 that a suggested draft reply 233 is being generated is shown surfaced in the example application UI 106. According to an example, the indication 303 is displayed upon selection of a shortened summary 224 or upon receiving a user input of a custom summary input. In some examples, one or more statements 305 are included in the indication 303 that inform the user about what is happening in the background during the loading state.

With reference now to FIG. 3D, an example generated suggested draft reply 233 is shown surfaced in the application UI 106. As depicted, in some examples, the suggested draft reply 233 includes a high-quality complex response, rather than a generic response that requires extraneous editing by the user. For instance, a more generic response is less likely to match the user's intent and to capture the personality of the user. According to examples, the user is able to tune/edit the suggested draft reply 233. For instance, the user may view the suggested draft reply 233 for a length of time and/or scroll through at least a portion of the body of the suggested draft reply 233. According to examples, one or more customization options 316 are provided in the application UI 106 that allow the user to select between various options to reframe the prompt provided to the generative AI model 108, so that a next-generated suggested draft reply 233 will better match the user's intent, sentiment, etc. In some examples, the customization options 316 include various tone of voice options. Some non-limiting example tone of voice customization options 316 are depicted in FIG. 3E. For instance, example voice customization options 316 include a "serious" tone, an "excited" tone, a "cheeky" tone, a "congratulatory" tone, a "celebratory" tone, and other options. In further examples, the customization options 316 include various length options. Some non-limiting example length customization options 316 are depicted in FIG. 3F. For instance, example length customization options 316 include "short", "medium", and "long". In still further examples, the customization options 316 include a user input option. For instance, selection of the user input option allows the user to provide a customized sentiment input. For instance, the user may type, speak, or otherwise input a phrase or individual keywords in association with a desired sentiment or intent for the reply.

Figure 3G:
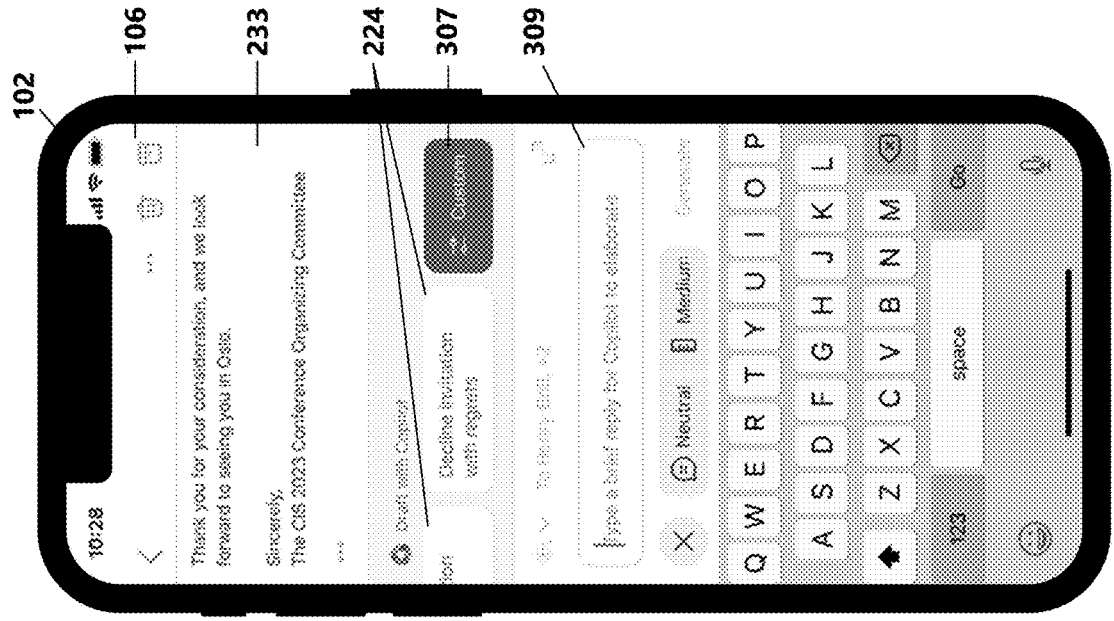
FIG. 3G is an illustration showing a concurrent display of the suggested draft reply and the shortened summaries according to an example.
Figure 3F:
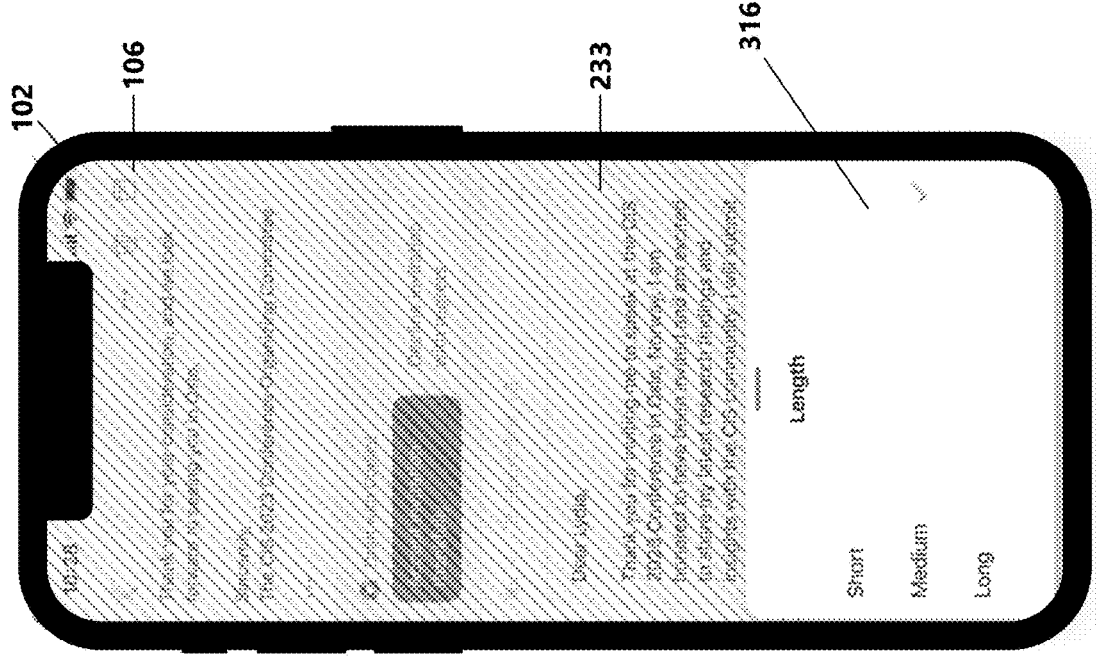
FIG. 3F is an illustration showing further additional customization options according to an example.

FIG. 3G shows concurrent display of the suggested draft reply 233 and the shortened summaries 224 in the application UI 106. In some examples, the user may determine the suggested draft reply 233 does not quite match what they want. Accordingly, the user can select a different shortened summary 224 provided in the application UI 106 to generate a different suggested draft reply 233. In some examples, a custom option 307 is provided for allowing the user to input a custom summary. As depicted in FIG. 3H, the user may select the custom option 307. In some examples, when the custom option 307 is selected, a field 309 is provided in which the user can type, speak, or otherwise input a phrase or individual keywords in association with inputting a custom summary for the suggested draft reply 233.

Figure 3I:
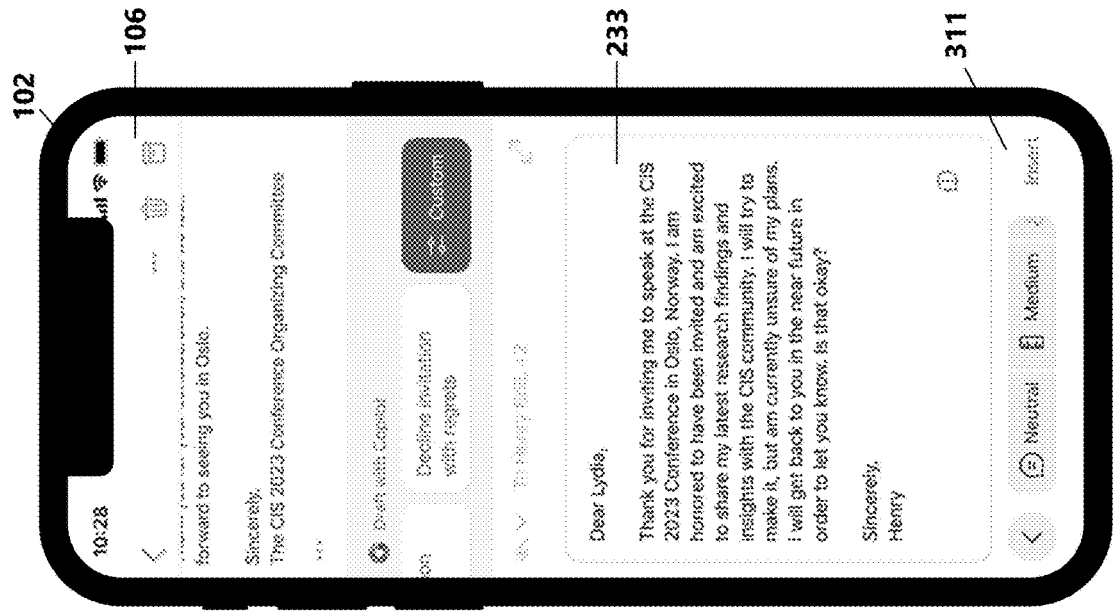
FIG. 3I is an illustration showing a selection to add the suggested draft reply to a reply message according to an example.
Figure 3H:
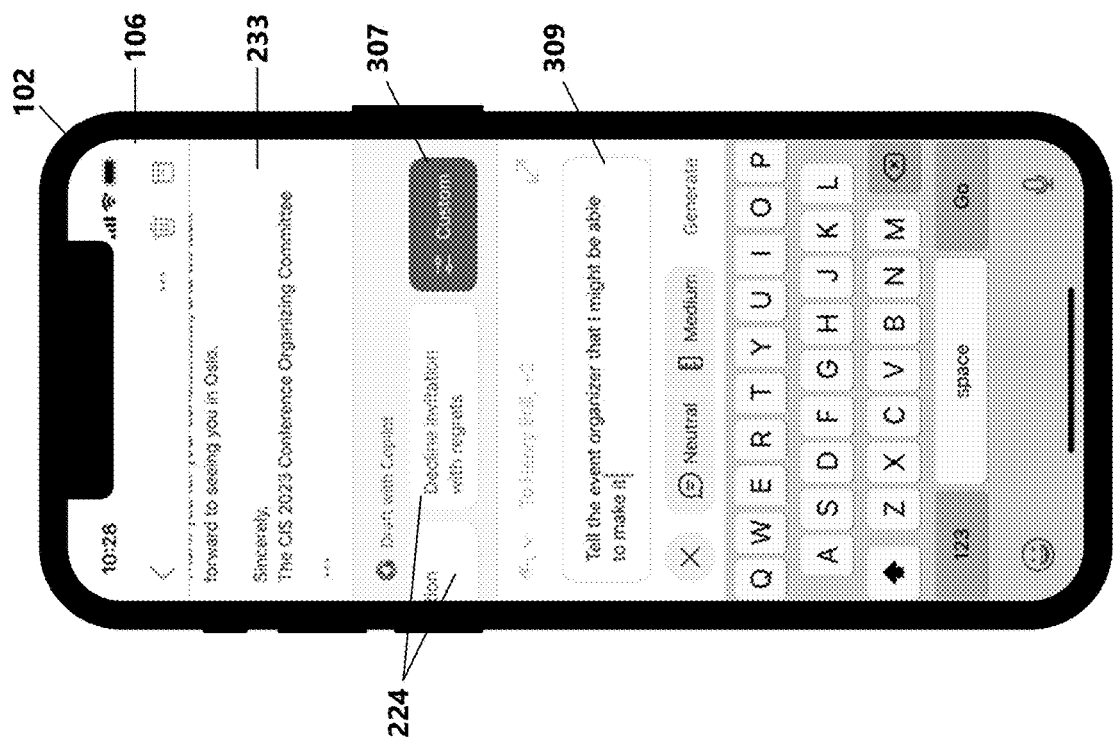
FIG. 3H is an illustration showing an example user input of a custom summary.

In some examples and as depicted in FIG. 3I, a continue option 311 is provided in the application UI 106. For instance, the user may select the continue option 311 upon determining the suggested draft reply 233 generally matches their intent. With reference now to FIG. 3J, when the continue option 311 is selected, the suggested draft reply 233 is injected into a reply message 244. In other examples, the suggested draft reply 233 is automatically injected into a reply message 244. According to examples, the reply message 244 is editable. The user may view the reply message 244 for a length of time and/or scroll through at least a portion of reply message 244. According to examples, the user may interact with the reply message 244 by editing text content or other content included in the message. In some examples, the user may add content, remove content, reformat content, etc., included in the reply message 244. In some examples, various editing options 319 are provided in the application UI 106 that allow the user to edit the reply message 244 until the content of the reply message 244 matches the user's intent and personal flair. According to an example, the draft reply message 244 includes a header and a body 302. In some examples, the recipient(s) of the reply message 244 are input into the header by the user. In other examples, the recipient(s) are determined and input into the header of a suggested draft reply 233 by the message generator 110.

According to examples, a send option 313 is provided in the application UI 106. The user may select the send upon 313 when they are ready to send the reply message 244 to the recipient(s). In some examples, upon selection of the send option 313, the reply message 244 is sent to the recipient(s). In other examples, one or more guardrails are employed to prevent the user from accidently sending a reply message 244 that has not been checked for accuracy. In some examples, and as depicted in FIG. 3K, selection of the send option 313 causes a display of a confirmation message 315. In an example implementation, the confirmation message 315 is displayed when the user has not made any changes (or a sufficient number of changes) prior to selecting the send option 313. In another example implementation, the confirmation message 315 is displayed when a time duration between displaying the suggested draft reply 233 and receiving a selection of the send option 313 has not satisfied a minimum time threshold. In another example implementation, the send option 313 is presented after the sufficient number of changes are made or after the minimum time threshold has been satisfied. In some examples, upon receiving confirmation from the user (e.g., a selection to continue, a non-selection of a back or cancel command 317 presented with the confirmation message 315 for a preset length of time), the reply message 244 is sent to the recipient(s).

Figure 4:
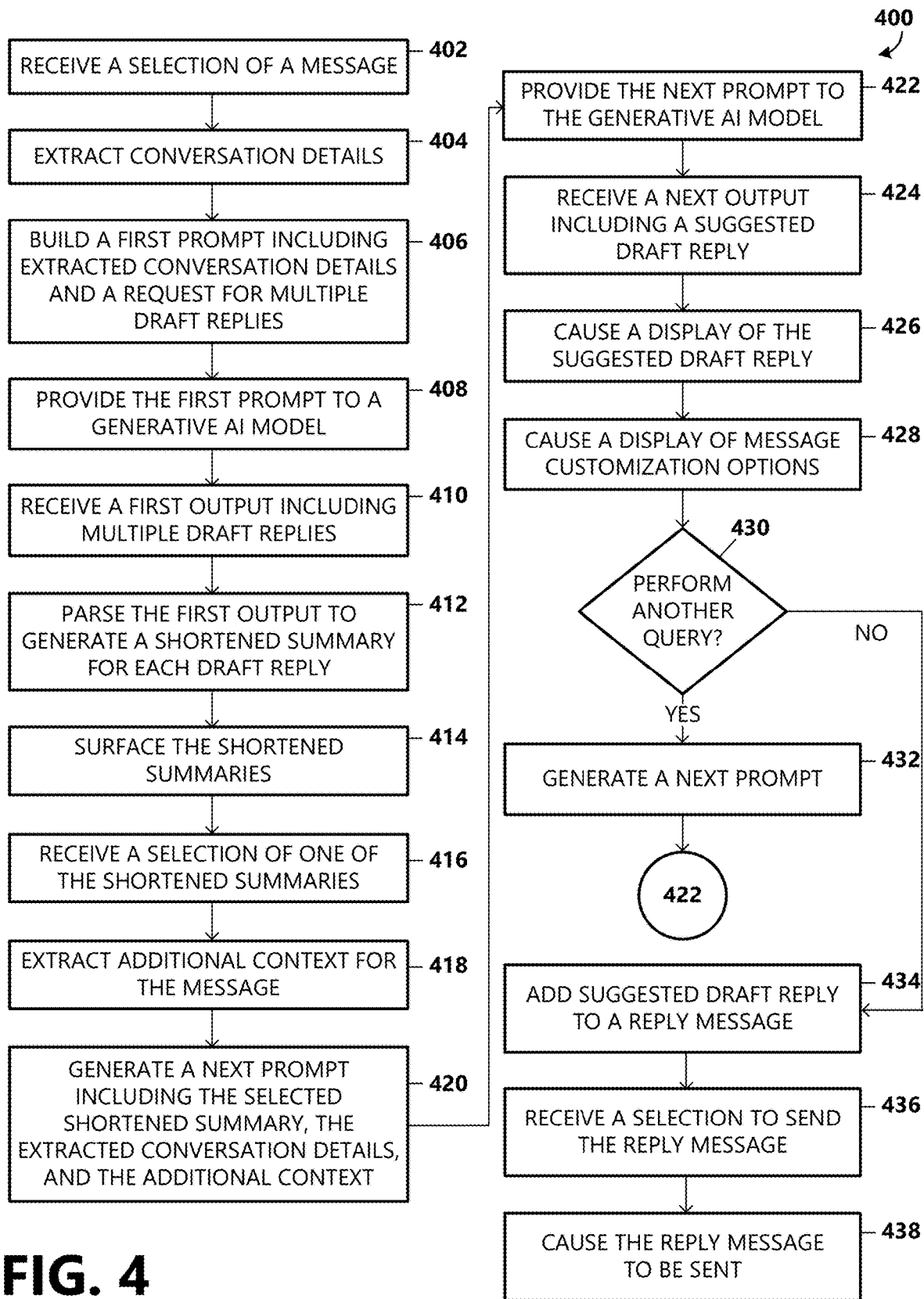
FIG. 4 is a flow diagram depicting an example method of generating a suggested draft reply.

FIG. 4 is a diagram illustrating an example method 400 of generating a suggested draft reply 233. For instance, the example method 400 generally describes a multi-turn process of generating a suggested draft reply 233 to a selected message 222. At operation 402, an indication of a selection of a message 222 in a message application 112 is received by the message generator 110. For instance, at operation 402, a user interacts with the message 222, such as by opening the message 222, focusing on the message 222, scrolling through at least a portion of the message 222, selecting to reply to the message 222, or another interaction. In some examples, the user interacts with the message 222 for at least an interaction threshold duration.

At operation 404, in a first turn of the multi-turn process, conversation details are extracted from the message 222. For example, the message generator 110 extracts message data including at least a portion of the body of the message 222. In some examples, the message generator 110 extracts the entire body of the message 222.

At operation 406, a first context object is generated including at least the extracted portion of the body of the message 222. The message generator 110 further builds a first prompt including the first context object and a predefined request. According to an example implementation, the predefined request includes a phrase or action to generate multiple replies to the message 222 included in the context object. In some examples, the message generator 110 requests a predefined number of replies to the message 222. In further examples, the message generator 110 defines a length limit of the replies (e.g., 5-7 words) in the first prompt.

At operation 408 the first prompt is included in a first query and is provided as input to the generative AI model 108. At operation 410, a first output from the generative AI model 108 is received. For instance, the generative AI model 108 analyzes the first text query and uses information included in the first context object to understand the context of the first prompt. The generative AI model 108 further generates the requested number of replies and provides the replies as the first output to the message generator 110. According to examples, the first output includes text output.

At operation 412, a shortened summary 224 for each reply included in the first output is generated. For instance, the message generator 110 parses the first output to identify the multiple replies. In some examples, the message generator 110 shortens/summarizes the first output by identifying a first delimiter, such as a colon, which may indicate a plurality of answers following the colon. According to an example, the postprocessor 206 discards the text output before the first delimiter and separates the text output into the multiple replies by the separation points (e.g., line breaks; numbers in a numbered list; bullets in a bulleted list; particular punctuation mark(s)). In further examples, the message generator 110 trims leading spaces and trailing spaces of each separated reply, and further identifies and removes content separated by particular punctuation marks (e.g., parentheses, square brackets, round brackets). In some examples, the message generator 110 further shortens replies that are over a summary word maximum. As a result, multiple shortened summaries 224 are generated that are representative of the AI-generated replies to the selected message 222. In some examples, the message generator 110 further discards the first output after the shortened summaries are generated.

At operation 414, the shortened summaries 224 are provided to the messaging application 112 and are surfaced in the application UI 106 for display to the user. In example implementations, the shortened summaries 224 are selectable. In some examples, an option to input a custom summary (e.g., a custom option 307) is also displayed in the application UI 106. In some examples, a field 309 is provided in which the user can input a custom summary.

According to an example, a second turn of the multi-turn process is triggered at operation 416, where a summary selection 304 is received. In some examples, the summary selection 304 includes one or a combination of a selection of a shortened summary 224, user input of a custom summary, and a customization option selection. In further examples, text content included in the user-selected shortened summary 224, the user-input custom summary, and/or selected customization option(s) 316 is extracted and received by the message generator 110. In some examples, an indication 303 that a suggested draft reply 233 is being generated is shown surfaced in the example application UI 106.

At operation 418, the message generator 110 extracts message data and obtains additional context. For instance, the extracted message data includes at least a portion of the body of the selected message 222. For instance, in the second turn, string content in the body of the message 222 and other content (e.g., multimedia content), if included, are extracted. In some examples, text content included in the header of the message 222 identifying the sender and one or more recipients of the message 222 is extracted. In further examples, text content included in a subject in the header is extracted. In an example implementation, the additional context includes additional data regarding the sender of the message 222. In some examples, the additional context includes additional data regarding the recipient(s) of the message 222. In further examples, the additional context includes additional data regarding historical sent messages from the user.

At operation 420, a second context object is generated including at least a portion of the extracted body of the message 222, the summary selection 304, and the additional context. The message generator 110 further generates a request phrase including a phrase or action to generate a reply to the message 222. In some examples, the message generator 110 includes a reference to or a description about the sender of the message 222 in the generated request phrase. In some examples, the message generator 110 includes a reference to or a description about the recipient(s) of the message 222 in the generated request phrase. In additional examples, the message generator 110 includes a length limitation for the reply (e.g., no more than 5 sentences, at least 3 paragraphs). In still further examples, the message generator 110 includes additional instructions in the generated request phrase, where the additional instructions include context inferred by the extracted message data and/or additional context. At operation 420, the message generator 110 generates a second prompt by combining the second context object and the generated request phrase. An example second prompt includes: ""I am emailing my boss. Write a brief email in no more than 5 sentences covering the following outline. Be polite and respectful." +second_context_Object."

At operation 422, the message generator 110 provides the second prompt in a second text query as input for the generative AI model 108. At operation 424, a second output from the generative AI model 108 is received. For instance, the generative AI model 108 analyzes the second text query and uses information included in the second context object to understand the context of the second prompt. The generative AI model 108 further generates the requested reply and provides the reply as the second output to the message generator 110. According to examples, the second output includes text output.

At operation 426, the second output is provided as a suggested draft reply 233 to the message 222. For instance, the suggested draft reply 233 is surfaced in the application UI 106 for display to the user. In some examples, the user may view the suggested draft reply 233 and determine whether the suggested draft reply 233 can be tuned to match the user's intent and sentiment. At operation 428, one or more customization options 316 are provided in the application UI 106. For instance, each customization option 316 corresponds to tone, length, or other option to reframe a subsequent prompt to provide to the generative AI model 108 for another suggested draft reply 233. For instance, the user may select to customize the suggested draft reply 233, select a different shortened summary 224, input a custom summary, or continue with the displayed suggested draft reply 233.

At decision operation 430, a determination is made as to whether to perform a subsequent query with the generative AI model 108. For instance, when one or more customization options 316 are selected, another shortened summary 224 is selected, or a custom summary is received, the message generator 110 generates a subsequent prompt for the generative AI model 108 including the selected editing option(s) 324. The method 400 returns to operation 422, where the subsequent prompt is included in a subsequent query provided to the generative AI model 108. For instance, results from the subsequent query are included in a next suggested draft reply 233 that is presented to the user in the application UI 106.

In some examples, when a selection is made by the user to continue with the displayed suggested draft reply 233, the suggested draft reply 233 is included in a reply message 244 at operation 434. For instance, the content included in the suggested draft reply 233 is inserted into the body 302 of the reply message 244. The user view the reply message 244 or edit the reply message 244 until it correctly matches the user's intent and sentiment. At operation 436, an indication of a selection to send the reply message 244 is received. The reply message 244 is sent to the recipient(s) at operation 438.

Figure 5:
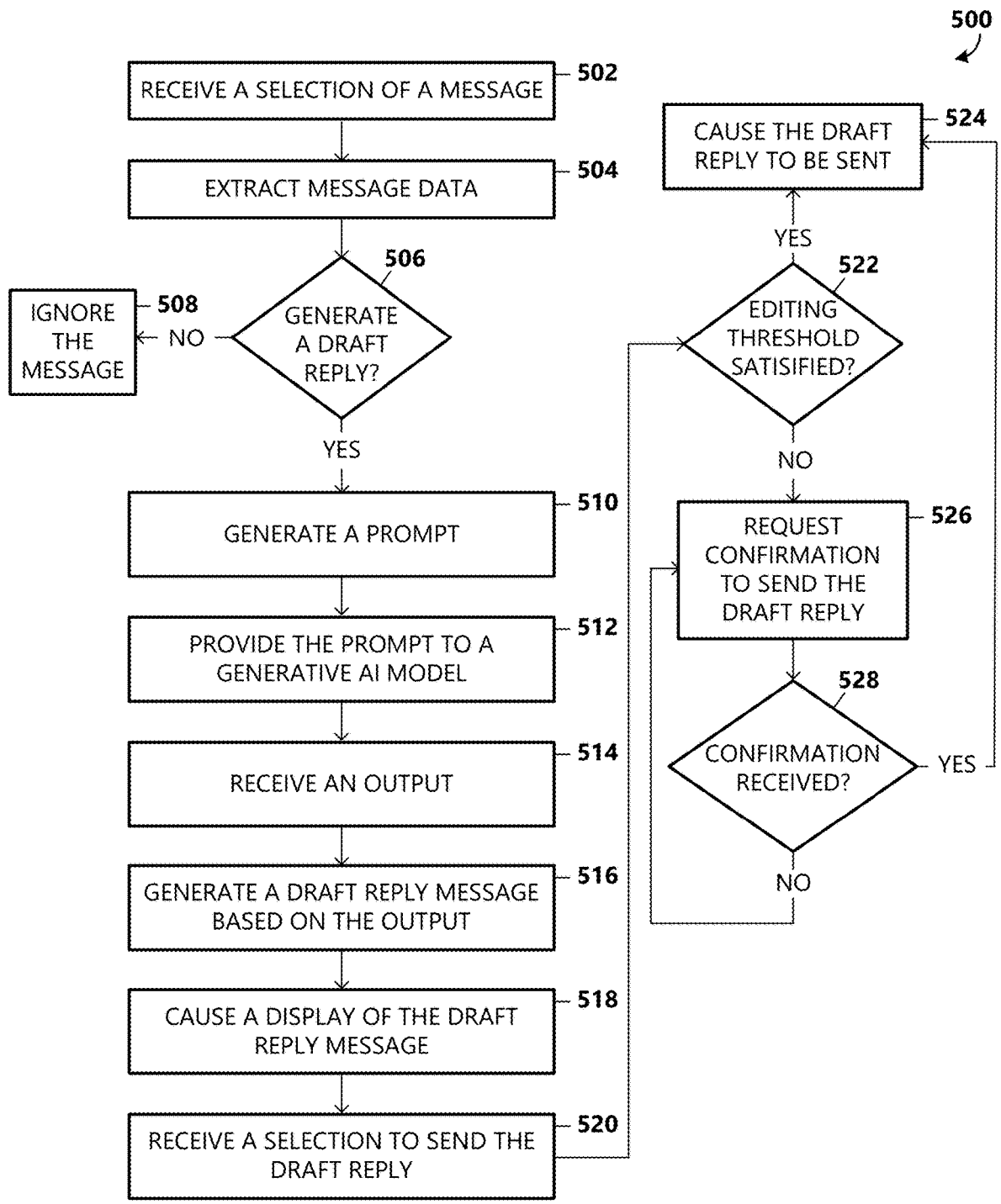
FIG. 5 is a flow diagram depicting another example method of generating a suggested draft reply.

FIG. 5 is a diagram illustrating an example method 500 of generating a suggested draft reply 233. For instance, the example method 500 generally describes a method of employing guardrails that prevent unnecessary generative AI model 108 processing and accidental sending of an AI model-generated draft. At operation 502, an indication of a selection of a message 222 in a message application 112 is received by the message generator 110. For instance, at operation 502, a user interacts with the message 222, such as by opening the message 222, focusing on the message 222, scrolling through at least a portion of the message 222, selecting to reply to the message 222, or another interaction. In some examples, the user interacts with the message 222 for at least an interaction threshold duration.

At operation 504, message data is extracted from the message 222. For example, the message generator 110 extracts at least a portion of the body of the message 222. In some examples, the message generator 110 extracts the entire body of the message 222.

At decision operation 506, a determination is made as to whether to generate a suggested draft reply message 233 for responding to the message 222. In some examples, the determination is made based on a message type. For instance, if the message 222 is classified as a focused message (e.g., rather than a promotional, bulk, or automatically generated message), the message satisfies a first criteria for generating a suggested draft reply message 233 for the message 222. In further examples, the determination is based on whether the message 222 includes confidential information. For instance, a suggested draft reply message 233 may not be generated for a confidential message. In another example, a selection is made by the user to generate a suggested draft reply message 233. In a further example, a selection is made by the user to not generate a suggested draft reply message 233. In some examples, when a determination is made to not generate a suggested draft reply message 233, the extracted message data is discarded and the message 222 is ignored at operation 508.

When a determination is made to generate a suggested draft reply message 233, the method 500 proceeds to operation 510, where a prompt is generated. For instance, the prompt includes a context object and a request phrase. In some examples, the context object includes at least a portion of the extracted body of the message 222. In other examples, additional data is extracted or otherwise obtained and included in the context object. For instance, the additional data can include data regarding the sender of the message 222, the recipient(s) of the message 222, historical sent messages, and/or additional context. In some examples, the request phrase includes a request for a reply to the message 222. In some examples, the prompt is generated in response to generation of multiple shortened summaries 224 and a user-selection of one of the generated shortened summaries 224 or a user-input summary.

At operation 512, the message generator 110 includes the prompt in a query and provides the query to the generative AI model 108. For instance, the generative AI model 108 analyzes the query and uses information included in the context object to understand the context of the prompt. The generative AI model 108 further generates the requested reply and provides the reply in text output to the message generator 110. At operation 514, the message generator 110 receives the text output from the generative AI model 108.

At operation 516, a suggested draft reply message 233 is generated based on the text output, and the suggested draft reply message 233 is displayed to the user at operation 518. For instance, the suggested draft reply message 233 is surfaced in the messaging application UI 106. In some examples, the user views (e.g., reads) the suggested draft reply 233. In further examples the user scrolls through at least a portion of the suggested draft reply 233. In another example, the user selects one or more customization options 316 corresponding to tone, length, or a user input to reframe a subsequent prompt to provide to the generative AI model 108 for another suggested draft reply 233. For instance, the user may select to customize the suggested draft reply 233. In further examples, the user selects to include the suggested draft reply 233 in a reply message 244. In still further examples, the user edits the reply message 244 to cause the reply message 244 to match the user's intent and sentiment.

At operation 520, a send option 313 is provided in the application UI 106 and an indication of a selection of the send option 313 is received. For instance, the user may select to send the reply message 244 to the recipient(s). In some examples, prior to providing the send option 313 in the application UI 106, a determination is made as to whether a minimum editing threshold has been satisfied. For instance, in some examples, the send option 313 is displayed/active when the minimum editing threshold has been satisfied. In other examples, the determination as to whether a minimum editing threshold has been satisfied is made at decision operation 522 in response to receiving a selection of the send option 313 at operation 520. In an example implementation, the minimum editing threshold corresponds to a minimum number of changes (e.g., 1-3 changes) made to the suggested draft reply 233 or the reply message 244. In another example implementation, the minimum editing threshold corresponds to a minimum time duration between displaying the suggested draft reply 233 and receiving a selection of the send option 313. In another example implementation, the minimum editing threshold corresponds to a minimum time duration between including/displaying the suggested draft reply 233 in the reply message 244 and receiving a selection of the send option 313.

In some examples, when a determination is made that the minimum editing threshold is satisfied, the method 500 proceeds to operation 524, where the reply message 244 is sent to the recipient(s). In other examples, when a determination is made that the minimum editing threshold is satisfied, the method 500 proceeds to operation 526, where confirmation to send the reply message 244 is requested from the user. For instance, in an example implementation, a confirmation message 315 is presented to the user.

At decision operation 528, a determination is made as to whether confirmation from the user is received. For instance, the user may select to continue to send the reply message 244, not select the back or cancel command 317 for a present length of time, or provide another indication of confirming an intention to send the reply message 244. When a determination is made that user confirmation is received, the reply message 244 is send at operation 524. Alternatively, in some examples, when a determination is made that confirmation is not received, the method 500 returns to operation 526 for user confirmation.

Figure 6:
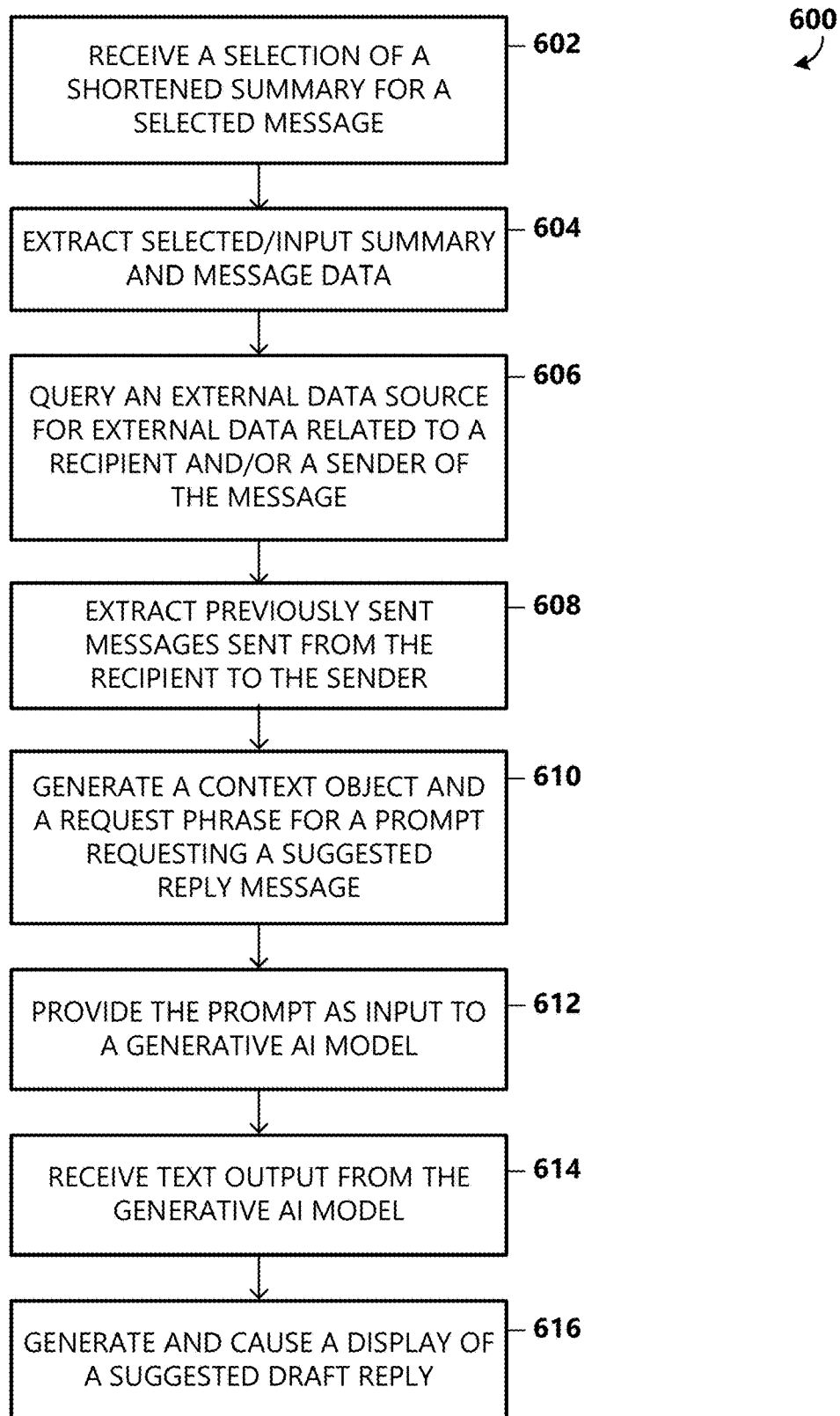
FIG. 6 is a flow diagram depicting an example method of generating a suggested draft reply.

FIG. 6 is a diagram illustrating an example method 600 of generating a suggested draft reply 233. For instance, the example method 600 generally describes a method of using inferred context to improve the suggested compose content for a suggested draft reply 233 for the user. At operation 602, an indication of a selection of a shortened summary 224 generated for a selected message 222 in a message application 112 is received by the message generator 110. For instance, a message 222 is received and selected by the user. Additionally, multiple shortened summaries 224 are generated and displayed to the user in the application UI 106. For instance, the shortened summaries 224 are representative of multiple AI-generated replies to the selected message 222. At operation 602, the user selects a shortened summary 224 or inputs a custom summary.

At operation 604, text of the selected shortened summary 224 or the custom summary is extracted. Additionally, message data is extracted from the message 222. In some examples, message data includes at least a portion of the body 302 of the message 222. When the message 222 is included in a communication thread, previous messages in the thread may be included in the body 302 of the message 222. In some examples, message data further includes at least a portion of the header of message 222, such as the sender, one or more recipients (e.g., the user, other recipients) of the message 222, and a subject, if included.

At operation 606, one or more data sources 208 are queried for additional data. In some examples, the data source(s) 208 are queried for data related to the sender of the message 222. In other examples, the data source(s) 208 are queried for data related to the user. In further examples, the data source(s) 208 are queried for data related to other recipients of the message 222. In an example implementation, the data source(s) 208 include a social medial profile of the sender/user/recipient(s). For instance, the user's profile information can be used to obtain information that can be used to personalize the suggested reply message 233. In some examples, the message generator 110 extracts information from the sender's profile, such as a signature information, a preferred name, preferred pronoun information, information about significant events associated with the sender of the message 222. In an example implementation, the data source(s) 208 include an organizational chart of an enterprise corresponding to the sender/user/recipient(s). For instance, information extracted from the organizational chart may define a relationship between the user and the sender of the message 222. When the message 222 includes a plurality of recipients, information extracted from the organizational chart may define relationships between the user and/or sender and the other recipient(s).

In some examples, at operation 608, the message generator 110 further extracts the user's historical sent messages from the messaging application 112. For example, the historical sent messages include one or more messages sent from the user to the sender of the message 222. In another example, the historical sent messages include one or more messages sent from the user to one or more other recipients of the message 222. The historical sent messages may be from sent message box or sent items folder, whereas the message 222 may be in an inbox. Where the message 222 is part of a conversation or message thread, the historical messages 222 may be messages that are not already included in the conversation or message thread.

At operation 610, a context object and a request phrase are generated for a prompt. In some examples, the message generator 110 includes at least a portion of the extracted message data in the context object. For instance, the extracted message data includes conversation thread history, where, in some examples, the message generator 110 leverages the conversation thread history to generate a suggested reply message 233 that points out missing or confusing content in the message 222. In some examples, the extracted message data further includes historical sent messages past communications with similar conversation participants that the message generator 110 leverages to infer the user's preferred communication style to further tailor the suggested draft reply 233 to user and/or sender of the message 222.

In further examples, the message generator 110 includes at least a portion of the extracted user profile data in the context object. For instance, information in the user's profile data can be used to cause the generative AI model 108 to correctly personalize the suggested draft reply 233 (e.g., generating a correct signature, using the user's domain experience to emphasize what the user might know versus ask for help). In still further examples, the message generator 110 includes at least a portion of the extracted sender profile data in the context object. For instance, information in the sender's profile can be used to produce an output from the generative AI model 108 that is tailored based on the sender's inferred expertise or interests, uses correct pronouns, includes pleasantries based on a development or event (e.g., congratulating the message sender on a recent promotion or anniversary), etc. In additional examples, the message generator 110 includes at least a portion of one or more other recipients' extracted profile data in the context object.

In yet additional examples, the message generator 110 includes at least a portion of the extracted organizational chart data in the context object. For instance, known relationships between the user and the sender can be leveraged in a prompt to produce an output from the generative AI model 108 that is further tailored to the user and sender. For instance, the message generator 110 produces a more professional suggested reply message 233 when replying to a vice president versus a more casual suggested reply message 233 when replying to a peer. In some examples, the request phrase includes a request directed to the generative AI model 108 to generate a message based on the context object. In an example implementation, the message generator 110 includes a reference to the sender of the message 222 and/or an inferred relationship between the user and the sender in the request phrase.

At operation 612, the prompt is provided to the generative AI model 108 as a query. For instance, the generative AI model 108 analyzes the query and uses information included in the context object to understand the context of the prompt. The generative AI model 108 further generates text output in response to the query and provides the response to the message generator 110. At operation 614, the message generator 110 receives the text output from the generative AI model 108. At operation 616, the message generator 110 parses the text output to generate a suggested draft reply 233 and causes a display of the suggested draft reply 233 in the application UI 106 on the user's computing device 102. In some examples, the suggested draft reply 233 is added to a reply message 244. In further examples, the user edits the suggested draft reply 233 and/or reply message 244 prior to sending the reply message 244 to the recipient(s) of the reply message 244.

According to examples, the message generator 110 leverages additional information, such as conversation thread history, to generate the prompt. Accordingly, the received output includes a less-generic response, which allows the message generator 110 to create a less-generic and more-thorough suggested reply message 233. Thus, less user editing may be required to match the contents of the reply message 244 to the user's intent and sentiment.

Figure 7:
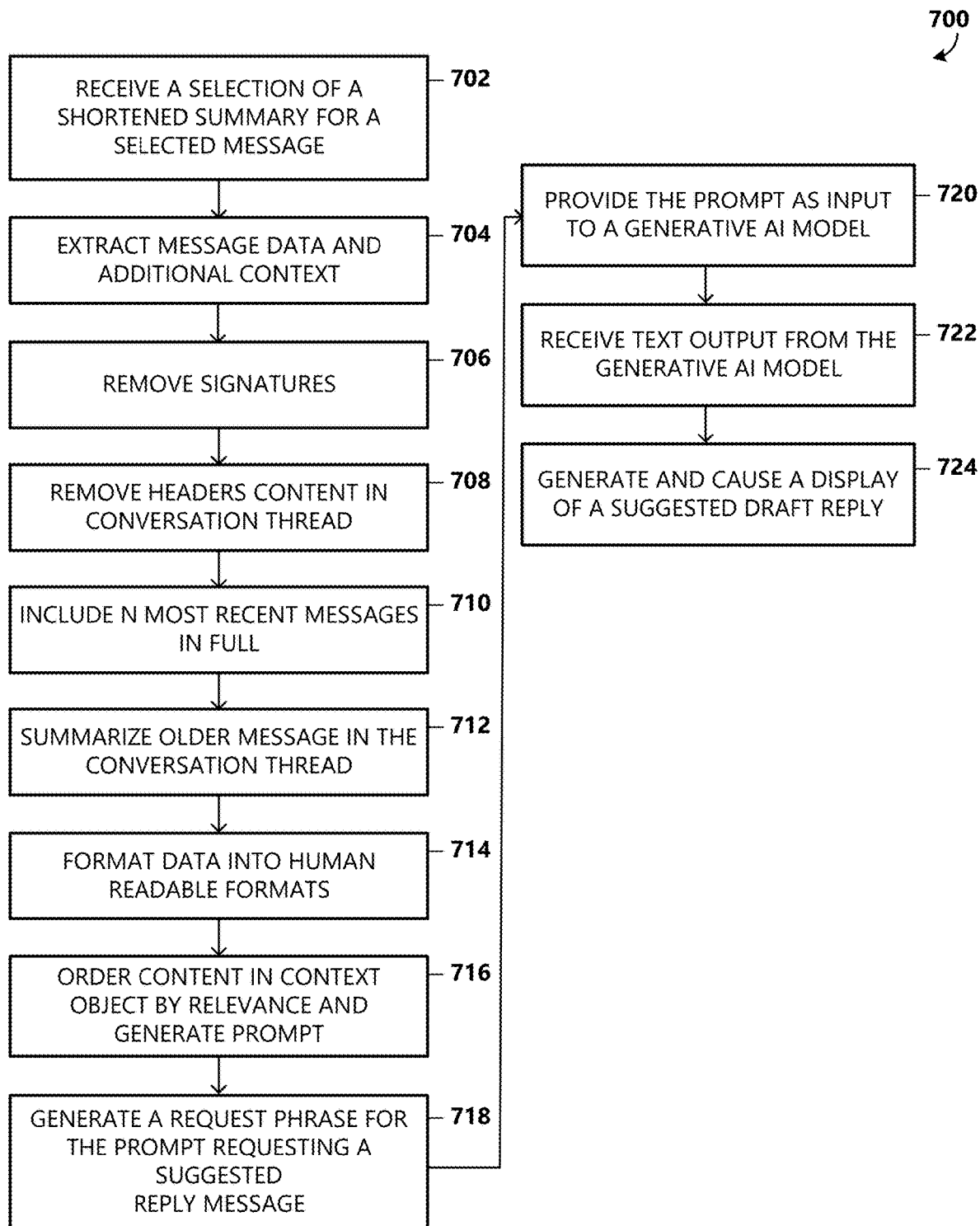
FIG. 7 is a flow diagram depicting an example method of generating a suggested draft reply.

FIG. 7 is a diagram illustrating an example method 700 of generating a suggested draft message, such as a suggested draft reply 233. In some examples, input prompts to the generative AI model 108 are limited in size. In other examples, latency can be impacted based on various attributes of the input prompt provided to the generative AI model 108. Thus, method 700 generally describes a process performed by the message generator 110 for optimizing the prompt that is provided as input to the generative AI model 108 so that it provides the most relevant response and/or utilizes fewer computing resources to generate the response.

According to examples, the generative AI model 108 is a language model trained on a vast corpus of text data. In some examples, the vast corpus of text data includes various languages. Accordingly, the generative AI model 108 is designed to understand and generate responses to words and phrases in various languages. In some examples, the training data on which the generative AI model 108 is trained is of a higher quality and quantity in a first language of a plurality of languages. Thus, the generative AI model's ability to understand and generate responses in the first language may be greater than the model's ability to understand and generate responses in other languages corresponding to less and/or lower quality training data.

In further examples, the generative AI model's performance further depends on the specific context in which the words or phrases are used in the prompt. For instance, the generative AI model 108 may use fewer tokens to process common words and phrases of the first language. Accordingly, the message generator 110 performs various operations to convert or otherwise format data into a human readable format in the first language and to remove or translate words, phrases, and other data that are less familiar to the generative AI model 108 into more familiar text data.

At operation 702, an indication of a selection of a shortened summary 224 generated for a selected message 222 in a message application 112 is received by the message generator 110. For instance, a message 222 is received and selected by the user. Additionally, multiple shortened summaries 224 are generated and displayed to the user in the application UI 106. For instance, the shortened summaries 224 are representative of multiple AI-generated replies to the selected message 222. At operation 702, the user selects a shortened summary 224 or inputs a custom summary.

At operation 704, text of the selected shortened summary 224 or the custom summary is extracted. Additionally, message data is extracted from the message 222. In some examples, message data includes at least a portion of the body 302 of the message 222. When the message 222 is included in a communication thread, previous messages in the thread may be included in the body 302 of the message 222. In some examples, message data further includes at least a portion of the header of message 222, such as the sender, one or more recipients (e.g., the user, other recipients) of the message 222, and a subject, if included. In further examples, additional data, additional context, etc., are extracted or otherwise obtained by the message generator 110.

According to examples, the message generator 110 pre-processes the extracted data to identify certain types of information in the extracted data and to selectively include or omit the information to reduce extraneous processing by the generative AI model 108. For instance, the message generator 110 selects particular information to include in a context object and a request phrase of a prompt for the generative AI model 108. In some examples, the message generator 110 identifies and removes information that adds to the size of the prompt without adding valuable context to the prompt. For instance, by reducing an amount of processing required by the generative AI model 108 to generate a response to the prompt, latency associated with generating an AI response to the message 222 is reduced.

To selectively identify the data to incorporate into a latency-improved prompt, primary content and secondary content of the message or message thread may be identified. The primary content is more relevant for generation of the draft reply than the secondary content. The primary content is included in the prompt, and the secondary content is discarded.

Some examples of secondary content may include headers, signatures, repeated content, older messages, etc. Accordingly, in some examples, at operation 706, the message generator 110 removes signature content from extracted messages included in a communication thread. In further examples, at operation 708, the message generator 110 removes headers from extracted messages included in a communication thread. In additional examples, the message generator 110 removes repeated content from extracted messages included in a communication thread. In yet additional examples, at operation 710, the message generator 110 removes (older) messages from an extracted communication thread that have a date/timestamp past a recency threshold. In further additional examples, at operation 712, the message generator 110 summarizes the older and includes the summaries in the prompt. As a result, the content of the older messages are still partially included in the prompt, but the contribution of the older messages to the prompt is shortened, which reduces prompt length and reduces latency.

At operation 714, the message generator 110 identifies data of particular formats, such as machine-readable formats, and converts the data into a human-readable format. For instance, a date in the format of "12/11/22" may be more ambiguous and, thus, require more processing by the generative AI model 108 to understand than the date in the format of "Dec. 11, 2022". Accordingly, the message generator 110 converts dates into a human readable format or the long format. While such an expansion of the data introduces more text into the prompt, the overall processing resources consumed by the generative AI model to process the long form of the date is actually less than required to process the short form of the date. As another example, time measurements in seconds are removed from timestamp data. For instance, timestamp data is used by the generative AI model 108 to understand a relationship between a date/time and the messages in the communication thread, and seconds time measurements are likely not relevant. In further examples, additional and/or alternative preprocessing operations are performed to optimize input data for the generative AI model 108.

At operation 716, the message generator 110 generates a context object for a prompt including the preprocessed data. In some examples, the message generator 110 includes the preprocessed data in a particular order corresponding to relevance or importance of the preprocessed data to understanding the context of the prompt or to generating a personalized and complex response to the selected message 222. In some examples, the message generator 110 determines relevance/importance by recency of the data (e.g., based on the date/timestamp), where the message generator 110 orders more relevance (e.g., recent) data later (e.g., towards the end) of the prompt. For instance, data determined to be more relevant/important is located towards the end of the context object of the prompt, where it is read and processed later by the generative AI model 108 than data included towards the beginning of the prompt. Through testing, it has been determined that LLMS may give greater weight to elements at the end of an input prompt than to elements at the beginning of the prompt. As a result, placing information that is deemed more important for the generation of the draft message at the end of the prompt inherently causes that information to be weighted more heavily without having to include additional text to the prompt. At operation 718, the message generator 110 further generates a request phrase for the prompt. In some examples, the generated request phrase includes a length limitation for the response. In other examples, the examples, the generated request phrase includes a tone in which to frame the response.

At operation 720, the prompt is provided as input to the generative AI model 108. For instance, the generative AI model 108 analyzes the input and uses information included in the context object to understand the context of the prompt. The generative AI model 108 further generates text output in response to the query and provides the response to the message generator 110. In examples, as a result of the preprocessing operations performed by the message generator 110, the generative AI model 108 uses less processing resources to generate the text output.

At operation 722, the message generator 110 receives the text output from the generative AI model 108. For instance, the text output is provided to the message generator 110 with reduced latency. At operation 724, the message generator 110 parses the text output to generate a suggested draft reply 233 and causes a display of the suggested draft reply 233 in the application UI 106 on the user's computing device 102. In some examples, the suggested draft reply 233 is added to a reply message 244. In further examples, the user edits the suggested draft reply 233 and/or reply message 244 prior to sending the reply message 244 to the recipient(s) of the reply message 244.

FIG. 8 is a block diagram illustrating physical components (e.g., hardware) of a computing device 800 with which examples of the present disclosure may be practiced. The computing device components described below may be suitable for one or more of the components of the system 100 described above. In a basic configuration, the computing device 800 includes at least one processing unit 802 and a system memory 804. Depending on the configuration and type of computing device 800, the system memory 804 may comprise volatile storage (e.g., random access memory), non-volatile storage (e.g., read-only memory), flash memory, or any combination of such memories. The system memory 804 may include an operating system 805 and one or more program modules 806 suitable for running software applications 850 (e.g., one or more messaging applications 112 and the content generator 110) and other applications.

The operating system 805 may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including one or more of the stages of the methods 400, 500, 600, and 700 illustrated in FIGS. 4-7. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 800 on the single integrated circuit (chip). Examples of the present disclosure may also be practiced using other technologies capable of performing logical operations such as, for example, AND, OR, and NOT, including mechanical, optical, fluidic, and quantum technologies.

The computing device 800 may also have one or more input device(s) 812 such as a keyboard, a mouse, a pen, a sound input device, a touch input device, a camera, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 804, the removable storage device 809, and the non-removable storage device 810 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer readable media may be part of the computing device 800. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As should be appreciated from the foregoing, the present technology results in multiple improvements to the technology. As one example, surfacing multiple potential draft replies prior to generating a more complex reply conserves overall usage and processing of the AI models. For instance, the initial prompt to the AI model to generate the multiple shortened draft replies is less complex and can be processed with lower latency, which allows for the shortened summaries to be displayed in relatively short amounts of time while the original message is still being viewed. The more complex draft, which has a more complex prompt and utilizes more computing resources of the AI model, may then be generated upon a selection of a particular type of reply message to be prepared. As a result, the complex AI model processing is only performed when requested, which avoids unnecessary expenditures. In addition, the complex processing is performed on additional confirmatory input, which increases the accuracy of the produced output and leads to fewer reruns of the AI model requests.

The guardrails provided by the present technology provide additional technical improvements. For example, by preventing requests from being generated for less than all messages, fewer requests are generated and the computing resources associated with the AI model processing are conserved. Similarly, by issuing the requests only after a sufficient interaction with a message is identified, erroneous or less-useful requests are avoided. In addition, by preventing the actual draft reply from being sent without sufficient interaction, the likelihood of erroneous data being transmitted is also reduced.

The inclusion of additional context from data sources outside of the message provides yet further technical improvements. As an example, by retrieving and incorporating the additional context, such as data for senders/recipients and prior sent messages, into the prompt, the resultant draft reply message requires fewer revisions to the message or requests for another draft message to be generated. For instance, without such context, the resultant draft reply may be inaccurate or incomplete, which may result in a second request for the AI model to generate an additional draft. Such additional requests waste computing resources that are conserved where the first output from the AI model is more accurate and complete due to the inclusion of the additional context. The additional operations to order and transform the data within the prompt itself also further increase the accuracy of the output along with reducing the total latency of the AI model processing. For instance, processing is improved by transforming the data into a format that is more efficiently processed by the AI model. In addition, limitations on the amount of data incorporated into the prompt similarly reduces the processing resources and time utilized by the AI model.

In an aspect, the technology relates to a system for generating a suggested reply message using a generative artificial intelligence (AI) model. The system includes a processor; and memory storing instructions that, when executed by the processor, cause the system to: receive a selection of a message; combine at least a portion of the message and a predefined request phrase to form a first prompt, the predefined request phrase requesting multiple draft replies; provide the first prompt to a generative AI model; receive, in response to the first prompt, a first output from the generative AI model including the multiple draft replies; parse the first output to generate a shortened summary for each of the draft replies; receive a selection of one of the shortened summaries; generate a second prompt by combining the portion of the message, the selected shortened summary, and additional context for the message; provide the second prompt to the generative AI model; receive, in response to the second prompt, a second output from the generative AI model including a suggested draft reply; and cause a display of the suggested draft reply.

In an example, the instructions further cause a display of the multiple shortened summaries concurrently with the message. In another example, the suggested draft reply is displayed concurrently with the display of the multiple shortened summaries. In yet another example, the instructions further cause the system to: inject the suggested draft reply into a reply message; provide a send option concurrently with the reply message; receive a selection of the send option; and send the reply message. In still another example, the additional context for the message includes additional data regarding at least one of a sender of the message or a recipient of the message. In still yet another example, the instructions further cause the system to: generate a request phrase including at least a portion of the additional context for the message; and include the generated request phrase in the second prompt.

In another example, the predefined request phrase includes a defined number of draft replies to be generated. In still another example, the predefined request phrase includes a length-limiting portion. In yet another example, the message is an email and the reply message is structured as a reply-all. In a further example, the instructions further cause the system to: cause a display of multiple customization options concurrently with the suggested draft reply; receive a selection of at least one customization option; generate a next prompt by combining the portion of the message, the selected shortened summary, the additional context for the message, and the at least one selected customization option; provide the next prompt to the generative AI model; receive, in response to the next prompt, a next output from the generative AI model including a reframed suggested draft reply; and cause a display of the reframed suggested draft reply. In a still further example, the multiple customization options include at least one of: tone customization options; and length customization options.

In another aspect, the technology relates to a computer-implemented method for generating a suggested reply message using a generative artificial intelligence (AI) model.

The method includes receiving a selection of a message having a body and a header; extracting the body from the message; combining the body and a predefined request phrase to form a first prompt, the predefined request phrase requesting multiple draft replies; providing the first prompt as input to a generative AI model; receiving, in response to the first prompt, a first output from the generative AI model including the multiple draft replies; parsing the first output to generate a shortened summary for each of the draft replies; surfacing the shortened summaries; receiving a selection of one of the shortened summaries; generating a second prompt by combining the body, the selected shortened summary, and additional context for the message; providing the second prompt to the generative AI model; receiving, in response to the second prompt, a second output from the generative AI model including a suggested draft reply; and surfacing the suggested draft reply in a user interface.

In an example, the method further includes, upon generating the shortened summaries, discarding the first output. In another example, the additional context for the message includes additional data regarding at least one of: a sender of the message; a recipient of the message; and historical sent message from the recipient of the message. In still another example, the predefined request phrase includes at least one of: a defined number of draft replies to be generated; and a length-limiting portion. In yet another example, the method further includes injecting the suggested draft reply into a reply message; providing a send option concurrently with the reply message; receiving a selection of the send option; and sending the reply message. In a further example, the method further includes causing a display of multiple customization options concurrently with the suggested draft reply; receiving a selection of at least one customization option; generating a next prompt by combining the portion of the message, the selected shortened summary, the additional context for the message, and the at least one selected customization option; providing the next prompt to the generative AI model; receiving, in response to the next prompt, a next output from the generative AI model including a reframed suggested draft reply; and causing a display of the reframed suggested draft reply. In yet another example, the method further includes generating a request phrase including at least a portion of the additional context for the message; and including the generated request phrase in the second prompt.

In another aspect, the technology relates to a computer-implemented method for generating a suggested reply message using a generative artificial intelligence (AI) model. The method includes causing a display of a user interface of a mobile-device email application; receiving a selection of an email from within the user interface; causing a display of the selected email; combining the email and a predefined request phrase to form a first prompt, the predefined request phrase requesting multiple draft replies to the email; providing the first prompt as input to a generative AI model; receiving, in response to the first prompt, a first output from the generative AI model including the multiple draft replies; parsing the first output to generate a shortened summary for each of the draft replies; causing a display of the shortened summaries in the user interface and concurrently with the selected email; receiving a selection of one of the shortened summaries; generating a second prompt by combining the email, the selected shortened summary, and additional context for the message; providing the second prompt to the generative AI model; receiving, in response to the second prompt, a second output from the generative AI model including a suggested draft reply; and causing a display of the suggested draft reply in the user interface and concurrently with the selected shortened summary.

In an example, the method further includes causing a display of multiple customization options concurrently with the suggested draft reply, wherein the customization options include tone customization options and length customization options; receiving a selection of at least one customization option; generating a next prompt by combining the portion of the message, the selected shortened summary, the additional context for the message, and the at least one selected customization option; providing the next prompt to the generative AI model; receiving, in response to the next prompt, a next output from the generative AI model including a reframed suggested draft reply; and causing a display of the reframed suggested draft reply in the user interface.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for generating a suggested reply message using a generative artificial intelligence (AI) model, comprising:
    a processor; and
    memory storing instructions that, when executed by the processor, cause the system to:
        receive a selection of a message;
        combine at least a portion of the message and a predefined request phrase to form a first prompt, the predefined request phrase requesting multiple draft replies;
        provide the first prompt to a generative AI model;
        receive, in response to the first prompt, a first output from the generative AI model including the multiple draft replies;
        parse the first output to generate a shortened summary for each of the draft replies;
        receive a selection of one of the shortened summaries;
        generate a second prompt by combining the portion of the message, the selected shortened summary, and additional context for the message;
        provide the second prompt to the generative AI model;
        receive, in response to the second prompt, a second output from the generative AI model including a suggested draft reply; and
        cause a display of the suggested draft reply.

2. The system of claim 1, wherein the instructions further cause a display of the multiple shortened summaries concurrently with the message.

3. The system of claim 2, wherein the suggested draft reply is displayed concurrently with the display of the multiple shortened summaries.

4. The system of claim 3, wherein the instructions further cause the system to:
    inject the suggested draft reply into a reply message;
    provide a send option concurrently with the reply message;
    receive a selection of the send option; and
    send the reply message.

5. The system of claim 1, wherein the additional context for the message includes additional data regarding at least one of a sender of the message or a recipient of the message.

6. The system of claim 1, wherein the instructions further cause the system to:
    generate a request phrase including at least a portion of the additional context for the message; and
    include the generated request phrase in the second prompt.

7. The system of claim 1, wherein the predefined request phrase includes a defined number of draft replies to be generated.

8. The system of claim 1, wherein the predefined request phrase includes a length-limiting portion.

9. The system of claim 1, wherein the message is an email and the reply message is structured as a reply-all.

10. The system of claim 1, wherein the instructions further cause the system to:
    cause a display of multiple customization options concurrently with the suggested draft reply;
    receive a selection of at least one customization option;
    generate a next prompt by combining the portion of the message, the selected shortened summary, the additional context for the message, and the at least one selected customization option;
    provide the next prompt to the generative AI model;
    receive, in response to the next prompt, a next output from the generative AI model including a reframed suggested draft reply; and
    cause a display of the reframed suggested draft reply.

11. The system of claim 10, wherein the multiple customization options include at least one of:
    tone customization options; and
    length customization options.

12. A computer-implemented method for generating a suggested reply message using a generative artificial intelligence (AI) model, the method comprising:
    receiving a selection of a message having a body and a header;
    extracting the body from the message;
    combining the body and a predefined request phrase to form a first prompt, the predefined request phrase requesting multiple draft replies;
    providing the first prompt as input to a generative AI model;
    receiving, in response to the first prompt, a first output from the generative AI model including the multiple draft replies;
    parsing the first output to generate a shortened summary for each of the draft replies;
    surfacing the shortened summaries;
    receiving a selection of one of the shortened summaries;
    generating a second prompt by combining the body, the selected shortened summary, and additional context for the message;
    providing the second prompt to the generative AI model;
    receiving, in response to the second prompt, a second output from the generative AI model including a suggested draft reply; and
    surfacing the suggested draft reply in a user interface.

13. The method of claim 12, further comprising, upon generating the shortened summaries, discarding the first output.

14. The method of claim 12, wherein the additional context for the message includes additional data regarding at least one of:
   a sender of the message;
   a recipient of the message; and
   historical sent message from the recipient of the message.

15. The method of claim 12, wherein the predefined request phrase includes at least one of:
   a defined number of draft replies to be generated; and
   a length-limiting portion.

16. The method of claim 12, further comprising:
   injecting the suggested draft reply into a reply message;
   providing a send option concurrently with the reply message;
   receiving a selection of the send option; and
   sending the reply message.

17. The method of claim 12, further comprising:
   causing a display of multiple customization options concurrently with the suggested draft reply;
   receiving a selection of at least one customization option;
   generating a next prompt by combining the portion of the message, the selected shortened summary, the additional context for the message, and the at least one selected customization option;
   providing the next prompt to the generative AI model;
   receiving, in response to the next prompt, a next output from the generative AI model including a reframed suggested draft reply; and
   causing a display of the reframed suggested draft reply.

18. The method of claim 12, further comprising:
   generating a request phrase including at least a portion of the additional context for the message; and
   including the generated request phrase in the second prompt.

19. A computer-implemented method for generating a suggested reply message using a generative artificial intelligence (AI) model, the method comprising:
   causing a display of a user interface of a mobile-device email application;
   receiving a selection of an email from within the user interface;
   causing a display of the selected email;
   combining the email and a predefined request phrase to form a first prompt, the predefined request phrase requesting multiple draft replies to the email;
   providing the first prompt as input to a generative AI model;
   receiving, in response to the first prompt, a first output from the generative AI model including the multiple draft replies;
   parsing the first output to generate a shortened summary for each of the draft replies;
   causing a display of the shortened summaries in the user interface and concurrently with the selected email;
   receiving a selection of one of the shortened summaries;
   generating a second prompt by combining the email, the selected shortened summary, and additional context for the message;
   providing the second prompt to the generative AI model;
   receiving, in response to the second prompt, a second output from the generative AI model including a suggested draft reply; and
   causing a display of the suggested draft reply in the user interface and concurrently with the selected shortened summary.

20. The method of claim 19, further comprising:
causing a display of multiple customization options concurrently with the suggested draft reply, wherein the customization options include tone customization options and length customization options;
receiving a selection of at least one customization option;
generating a next prompt by combining the portion of the message, the selected shortened summary, the additional context for the message, and the at least one selected customization option;
providing the next prompt to the generative AI model;
receiving, in response to the next prompt, a next output from the generative AI model including a reframed suggested draft reply; and
causing a display of the reframed suggested draft reply in the user interface.

* * * * *